(12) United States Patent
Jauriqui et al.

(10) Patent No.: US 11,143,630 B2
(45) Date of Patent: Oct. 12, 2021

(54) RESONANCE INSPECTION OF MANUFACTURED PARTS WITH WITNESS COUPON TESTING

(71) Applicant: VIBRANT CORPORATION, Albuquerque, NM (US)

(72) Inventors: Leanne Jauriqui, Albuquerque, NM (US); Greg Weaver, Rio Rancho, NM (US); Alexander J. Mayes, Albuquerque, NM (US)

(73) Assignee: Vibrant Corporation, Albuquerque, NM (US)

( * ) Notice: Subject to any disclaimer, the term of this patent is extended or adjusted under 35 U.S.C. 154(b) by 0 days.

(21) Appl. No.: 17/053,938

(22) PCT Filed: May 7, 2019

(86) PCT No.: PCT/US2019/031024
§ 371 (c)(1),
(2) Date: Nov. 9, 2020

(87) PCT Pub. No.: WO2019/217359
PCT Pub. Date: Nov. 14, 2019

(65) Prior Publication Data
US 2021/0247365 A1    Aug. 12, 2021

Related U.S. Application Data

(60) Provisional application No. 62/668,666, filed on May 8, 2018.

(51) Int. Cl.
*G01N 29/12* (2006.01)
*G01N 29/30* (2006.01)

(52) U.S. Cl.
CPC ............. *G01N 29/30* (2013.01); *G01N 29/12* (2013.01)

(58) Field of Classification Search
CPC .............................. G01N 29/30; G01N 29/12
USPC .......................................................... 73/1.86
See application file for complete search history.

(56) References Cited

U.S. PATENT DOCUMENTS

| | | | |
|---|---|---|---|
| 5,495,763 A | 3/1996 | Rhodes et al. | |
| 5,886,263 A * | 3/1999 | Nath ................... | G01N 29/045 73/579 |
| 9,157,788 B2 * | 10/2015 | Hunter ................. | G01N 29/223 |
| 9,927,403 B1 * | 3/2018 | Jauriqui .............. | G01N 29/4427 |
| 10,481,104 B2 * | 11/2019 | Hunter ................. | G01N 29/045 |
| 10,746,704 B2 * | 8/2020 | Jauriqui ............. | G01N 29/4454 |
| 2007/0006651 A1 * | 1/2007 | Kruger .................. | G01N 29/11 73/579 |
| 2012/0158319 A1 | 6/2012 | Hunter et al. | |
| 2014/0060188 A1 | 3/2014 | Singh et al. | |
| 2016/0184893 A1 | 6/2016 | Dave et al. | |
| 2019/0212303 A1 * | 7/2019 | Jauriqui ............. | G01N 29/4454 |

(Continued)

*Primary Examiner* — Jacques M Saint Surin
(74) *Attorney, Agent, or Firm* — Holzer Patel Drennan

(57) ABSTRACT

Resonance inspection of parts in which a resonance standard to which a frequency response of the part is compared is at least in part based on a property derived from testing of a witness coupon that is manufactured concurrently with the part. This approach may allow properties of a material and/or manufacturing technique used to produce the part and witness coupon to inform the resonance standard to improve testing. Approaches are described related to both empirically derived resonance standards as well as model-based resonance standards.

42 Claims, 13 Drawing Sheets

(56) References Cited

U.S. PATENT DOCUMENTS

2019/0213306 A1\*  7/2019  Caselles .............. G06F 3/04883
2019/0234908 A1\*  8/2019  Meile ................. G01N 29/4436

\* cited by examiner

RESONANCE INSPECTION OF MANUFACTURED PARTS WITH WITNESS COUPON TESTING

RELATED APPLICATION

This PCT Application is a National Phase Application under 35 U.S.C. § 371 of PCT Application PCT/US2019/031024 filed on May 7, 2019, "RESONANCE INSPECTION OF MANUFACTURED PARTS WITH WITNESS COUPON TESTING," which claims the benefit of U.S. Provisional Application No. 62/668,666, filed on May 8, 2018, entitled "RESONANCE INSPECTION OF MANUFACTURED PARTS WITH WITNESS COUPON TESTING," the entirety of which is incorporated herein by reference.

FIELD

The present disclosure generally relates to nondestructive testing of parts, and particularly to nondestructive testing using resonance inspection techniques.

BACKGROUND

Resonance inspection (e.g., resonance ultrasound spectroscopy (RUS) or the like) has been proposed as a means for nondestructive testing of parts. Resonance inspection includes exciting a part-under-test at a plurality of input frequencies and measuring a frequency response of the part at each of the input frequencies. In a resonance inspection, the frequency response of the part may be compared to a resonance standard to evaluate the part. The reference standard may be generated based on measured frequency responses from other parts that have also undergone some other type of inspection (e.g., destructive testing after performing a resonance inspection of the part) to determine whether such parts were "good" or acceptable for use or "bad" or unacceptable for use. That is, the frequency response of known good and/or known bad parts may be determined and used to generate the resonance standard against which a frequency response of a part-under-test is compared for evaluation of the part. In other contexts, a model of a part may be created (e.g., using computer assisted design (CAD) software or the like), and the model of the part may be evaluated using modeling techniques to generate a modeled frequency response for good and/or bad parts that is compared the actual results of a resonance inspection of a part-under-test for evaluation of the physical part-under-test. In any regard, a resonance standard may provide analytical criteria so as to facilitate characterization of a part as either a good part or a bad part based on a comparison of the frequency response of the part to the resonance standard.

SUMMARY

In view of the foregoing, it is presently recognized that previously proposed approaches to nondestructive testing using resonance inspection of parts continue to suffer from a number of drawbacks, disadvantages, and difficulties at least in certain contexts. For instance, it is presently recognized that generation of a resonance standard to be used in the evaluation of a part using a resonance inspection may present difficulties in some applications that may reduce the effectiveness of resonance inspection. Accordingly, the present disclosure employs testing of a witness coupon that is manufactured concurrently with a part to provide a resonance standard at least in part based on the testing of the witness coupon.

In this regard, it may be appreciated that a resonance standard as described herein may generally be any criteria or parameters against which a frequency response of a part under test may be compared to evaluate the part for characterization or classification of the part as good or bad. A resonance standard may comprise an input into an analytical approach to the comparison of a frequency response of a part to determine whether the part is acceptable or unacceptable. That is, a sorting algorithm may include a resonance standard as an input for use in determining, according to the sorting algorithm, whether the part is acceptable or unacceptable. A resonance standard may be developed base on an empirical approach or a model-based approach among other possibilities. Both of these approaches are described and contemplated herein. Moreover, a resonance standard may have affirmative or negative data. That is, a resonance standard may have criteria defining good parts such that if a part's frequency response matches the good criteria, the part may be categorized as good. Additionally or alternatively, a resonance standard may have criteria defining bad parts such that if a part's frequency response matches the bad criteria, the part may be categorized as bad.

As generally described above, one approach to the generation of a resonance standard has included an empirical approach. An empirical approach may include gathering frequency response data from a statistically significant population of parts such that the resonance standard is generated based on the measured frequency response of parts comprising the population of parts. Alternatively, model-based approaches have been proposed. In the model-based approach, a computer-assisted drafting (CAD) digital model of a part may be generated and computational modeling approaches may be applied to derive a modeled resonance standard. Either approach suffers from specific difficulties and drawbacks as described below.

For example, an empirically derived resonance standard that is generated based on testing a population of parts to measure frequency responses from known good and/or known bad parts may not be feasible in all applications due to the cost and time required to test the requisite statistically significant number of parts comprising the population of parts. As may be appreciated, testing the population of parts may include both a resonance inspection and alternative (e.g., destructive) testing to gather sufficient information for generation of a resonance standard based on the measured frequency responses. As may be appreciated, generating a resonance standard may utilize statistical methods for the analysis of the frequency response data. In turn, a statistically significant population of parts may be required to be tested. As such, given the relatively large number of parts that may be required to be tested, the cost and time required for such an approach may exceed practical limits for a given part. This may especially be the case for parts with very low production numbers.

Further still, the empirical approach to generate a resonance standard may assume relatively homogenous material properties for raw materials used to manufacture parts and/or for finished parts. For instance, in traditional part production, known manufacturing techniques may be applied to raw materials that have well-known and homogenous material properties such that it may be assumed that a part manufactured from such raw materials may also have predictable material properties. However, additive manufacturing (AM) techniques are increasingly being employed to produce parts. In the context of AM, the material properties for a part may vary based on a number of variables related to the AM process including the raw materials used, characteristics of an AM tool used to manufacture the part, and/or computational considerations regarding machine instructions provided to an AM tool, among a multitude of other variables. In short, the predictability and/or homogeneity of parts produced by AM may not be the same as parts made from traditional manufacturing techniques. In turn, the assumption regarding the applicability of data regarding the population of parts and a part-under-test may not be sufficiently accurate for evaluation of parts made by AM.

Moreover, the use of a model-based approach for the generation of a resonance standard may also present challenges to achieving sufficient accuracy to provide a valid resonance standard to which a physical part is compared in certain contexts. Parts having simple geometries may allow for the use of relatively well understood analytic models, but these are rarely practical due to part geometry requirements that are typically more complex than the geometries that can be described by simple models. Accordingly, a model of a part (e.g., a digital model produced by a CAD program) may be generated to determine a modeled frequency response of a part. In this case, even parts having a complex geometry may be modeled using computational analysis of the digital model (e.g., a finite element analysis comprising a modal analysis). Making the model geometrically accurate is usually straightforward; however complexity is introduced in assuring that a finite element mesh used in a finite element analysis is fine enough to achieve sufficient accuracy. Moreover, as the mesh used in such an analysis becomes finer, greater computational resources are required to perform the analysis. In turn, use of a finite element analysis to perform a modal analysis for predicting or modeling a frequency response presents a balance of between time and computing resources on the one hand and accuracy on the other.

Further still, other aspects of the finite element analysis of a digital model relevant to modeling or predicting a frequency response of a part may be difficult to measure and/or relatively variable. Again, especially in the context of parts produced by AM, material properties, dimensions, and other variables may be less predictable than in traditional manufacturing. Some of the model parameters that may affect the modal analysis performed on a digital model of a part may include material properties, dimensional variation within tolerance limits, homogeneity, and stress states. Accordingly, as described above, while material properties and/or other parameters for traditional materials and are well documented, these parameters for parts made by AM, even of the same chemistry as legacy preparations, are less well-characterized.

In view of the foregoing challenges that are presently identified with proposed approaches to resonance inspection, the present disclosure generally leverages the use of a witness coupon in conjunction with a resonance inspection of a part to at least partially facilitate improved resonance inspection testing of the part. A witness coupon refers to a structure that is concurrently manufactured with a part to be tested. In this regard, the witness coupon may be manufactured using the same raw materials, tooling, and/or process variables as the part to be tested. Accordingly, the present disclosure generally includes testing of a witness coupon to derive properties common to both the witness coupon and the part to be tested. These properties may be common to both the witness coupon and part, and which may include material properties, may be used in relation to a resonance standard against which a part is evaluated using a resonance inspection. For instance, the resonance standard may be generated at least in part based on the properties determined from witness coupon testing or an existing resonance standard may be modified in view of the properties determined from witness coupon testing. As will be described in greater detail below, testing a witness coupon to determine properties that inform a resonance standard may be used in connection with resonance standards that are generated based on either of the two approaches described above of testing a population of parts or using a model-based approach.

Accordingly, a first aspect included in the present disclosure relates to a method for performing a resonance inspection of a part. The method includes obtaining a witness coupon that is manufactured concurrently with a part to be tested. Specifically, the witness coupon and the part comprise a material from which the witness coupon and the part are both manufactured. As described above, given that the part and the witness coupon are concurrently manufactured from the same material, it may be safely assumed that the part and witness coupon exhibit similar, if not identical, properties.

The method may also include testing the witness coupon to determine a property of the material. As will be described in greater detail below, the property of the material may be one or more material properties including, for example, a modulus of elasticity (Young's modulus), a Poisson's ratio, or any other appropriate material property.

The method further includes performing a resonance inspection of the part. The resonance inspection includes exciting the part at a plurality of input frequencies and obtaining a frequency response of the part at each of the plurality of input frequencies. In turn, the method includes comparing the frequency response of the part to a resonance standard. The resonance standard is at least in part based on the property of the material as determined by the testing of the witness coupon. As such, the method includes characterizing the part as acceptable or unacceptable based on the comparing.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment, the part and the witness coupon are concurrently manufactured using an AM process. The AM process may comprise any appropriate AM process including without limitation any binder jetting, directed energy deposition, material extrusion, material jetting, powder bed fusion, sheet lamination, or vat photopolymerization process, without limitation. In a specific embodiment, the AM process may comprise direct metal laser sintering (DMLS) in which metal powder is selectively sintered using a computer-controlled laser to build successive layers of a part.

The witness coupon that is tested in the method of the first embodiment may take any one of a number of different forms. For instance, the witness coupon may comprise a specifically manufactured structure to serve as a witness coupon. Alternatively, in the context of a batch of parts, a given one of the parts of the batch may be used (e.g., sacrificed) as a witness coupon. In this latter respect, the witness coupon may be another part manufactured concurrently with the part. Specifically, the another part may be manufactured based on a nominal specification shared with the part. That is, the part serving as the witness coupon may be a part that is manufactured to the same nominal specification as the part to be tested. The nominal specification may include a specification for the part's dimension, method of manufacture, tolerances, geometry, or any other appropriate specified characteristic of the part or method for manufacturing the part.

Alternatively, the witness coupon comprises a shape different than the part. For instance, the witness coupon may be of relatively simple geometry. This may assist in deriving the property of the material from the witness coupon based on a resonance inspection of the witness coupon. For instance, the witness coupon may be a simple right cylinder or simple parallelepiped. Such geometries may allow for material properties to be derived or "inverted" from the frequency response of the witness coupon using known relationships between the frequency response of such simple shapes and the property of the material desired to be determined. Such geometries may include commonly used shapes for destructive testing (e.g., tensile testing).

As described above, in addition to the property of the material from which the part and the witness coupon are manufactured, a number of other part characteristics may affect the applicability of a resonance standard for the part. These other part characteristics may be determined (e.g., measured) to assist in generating or modifying a resonance standard to provide a more precise and/or accurate evaluation of the part. In one embodiment, this may include measuring at least one dimension of the part such that the resonance standard is at least in part based on the at least one dimension. As may be appreciated, while a part may be designed and manufactured to a nominal specification that may include targeted dimensions, the actual physical part that is produced by a manufacturing process may have variations relative to the nominal specification. These variations may be acceptable as long as they are within an acceptable tolerance range, yet the variation may still be significant enough to affect the frequency response of the part. In turn, accurately measuring the actual dimensions of the part to be tested may allow for these dimensions to be used as a basis for a resonance standard for the part. A number of means for measuring the actual dimensions of the part are contemplated including physical measurement approaches and/or digital scanning of the part. In the latter regard, the measuring may include scanning the part using a three-dimensional scanner. The measuring may include scanning the part using a structured light three-dimensional scanner. The structured-light three-dimensional scanner may include at least one of white light scanning and blue light scanning.

Another part characteristic that may be used to refine a resonance standard for a part may include the stress state of the part. In this regard, the method may include measuring a stress state of the part such that the resonance standard is at least in part based on the stress state. Measuring the stress state may include an x-ray diffraction inspection of the part.

As described above, the method of the first aspect may be utilized for the evaluation of a single part or a plurality of parts. In relation to the use of the method of the first aspect to evaluate a plurality of parts, it may be that the witness coupon is manufactured concurrently with each of the plurality of parts to be tested. For instance, the plurality of parts to be tested may be part of a batch of parts with which the witness coupon is also manufactured. In this regard, the performing, comparing, and characterizing steps of the method may be repeated for a plurality of parts that are all concurrently manufactured from the material. As such, the method may be performed on a plurality of parts each manufactured in a common batch as the part and the witness coupon. The plurality of parts may include all parts manufactured in the common batch.

As stated above, the method of the first aspect may be applicable regardless of the manner in which the resonance standard is derived. Accordingly, the resonance standard of the method of the first aspect may be derived from an empirical approach comprising testing a population of parts or may be model-based. In relation to a model-based approach, the resonance standard may be generated at least in part based on a computer-generated three-dimensional digital model of the part having the property of the material as determined by the testing. As such, a finite element analysis (e.g., a modal analysis) may be performed on the digital model to generate a model resonance response of the part. The resonance standard may be at least in part based on the model resonance response of the part. In this regard, the resonance standard may include a window of acceptable resonance responses defined relative to the model response provided by the finite element analysis of the digital model. The window of acceptable resonance responses may be generated based on model responses of a plurality of variations of at least one of the property of the material or the at least one dimension within a predetermined range relative to the digital model.

Moreover, using the model-based approach to developing a resonance standard may include modeling the frequency response of a good part or modeling the frequency response of a bad part. In this regard, the resonance standard may be based on a model response of the digital model having at least one defect. Accordingly, if the frequencies response of the part that is tested conforms to the modeled frequency response of a defective part, the part may be characterized as defective. Accordingly, the part may be characterized as defective based on a correspondence between the frequency response of the part and the model response of the digital model having the at least one defect. That is, the resonance standard may utilize frequency responses of good and/or bad parts for use in comparing a frequency response of a part under test as described above.

As an alternative to the model-based approach, the resonance standard may be generated in an empirical approach in which the resonance standard is at least in part based on resonance inspection results for a plurality of tested parts other than the part. The at least one material property determined by the testing of the witness coupon may reduce the plurality of tested parts to a subset of tested parts with corresponding material properties to the at least one material property. The resonance standard may, therefore, be based on the resonance inspection results for the subset of tested parts.

In an embodiment, the resonance inspection of the part may occur prior to completion of the manufacturing of the part. This may be particularly applicable to AM of a part in which the part is manufactured through the addition of layers to the part. In this regard, the resonance standard may be applicable to the partially finished part. As the part may be evaluated prior to completion, continued manufacture of the part may be aborted or modified based on the resonance inspection of the completed part. In this regard, the resonance standard and resonance evaluation may include the part as well as a build platform. That is, the entire manufacturing system may be modeled to determine if a part that is in-process (i.e., not finished) is acceptable or unacceptable.

In various embodiments, the manner in which the witness coupon is tested to determine the property of the material may vary. For instance, the witness coupon may undergo destructive testing to determine the material property. Alternatively, the test may include a resonance inspection of the witness coupon. As such, the method may include performing the resonance inspection of the witness coupon to measure the property of the material.

A second aspect of the present disclosure relates to a method for generating a resonance standard for evaluation of at least one part using a resonance inspection of the at least one part. The method includes modeling a part to be tested using a nominal specification for the part. The modeling generates a computer-generated three-dimensional digital model of the part based on the nominal specification. The method also includes receiving at least one property of a material from which the part is manufactured, wherein the property of the material is input to the digital model, where the material property is derived from testing of a witness coupon concurrently manufactured with the part. In turn, the method includes performing a finite element analysis on the digital model based on the property to generate a model resonance response of the part as manufactured from the digital model. The method also includes generating a resonance standard for the part based on the finite element analysis of the digital model.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, the resonance standard may include a window of acceptable resonance responses defined relative to the model response provided by the finite element analysis of the digital model. That is, while the modal analysis of the digital model may provide a definitive modeled frequency response, the resonance standard that is generated by the method may include acceptable ranges that allow a certain amount of variation relative to the modeled frequency response. The development of these ranges may include varying a model through acceptable parameter ranges related to material properties, part dimensions, defects, or the like.

In an embodiment, the property of the material may be based on a test of a witness coupon that is manufactured concurrently with the part and comprises the material from which the part is manufactured. The test may include a resonance inspection of the witness coupon. In this regard, the method may include performing the resonance inspection of the witness coupon to measure the property of the material.

In an embodiment, it may also be advantageous to provide an input to the digital model regarding one or more exact dimensions of the physical part to be tested. As discussed above, the actual physical part to be tested may vary to the nominal specification reflected in the digital model (e.g., due to tolerances or the like). In this regard, providing the actual measured value for a part may result in a more accurate modeled frequency response rather than simply relying on the nominal specification of the part. In this regard, the method may include receiving at least one dimension of the part as manufactured, wherein the dimension is used to refine a corresponding nominal dimension of the nominal specification for the part. In an embodiment, the dimension of the part may be determined using a three-dimensional scanner to measure the dimension from the part. The three-dimensional scanner may include a structured-light three-dimensional scanner that employs at least one of white light scanning and blue light scanning. Accordingly, the method may include measuring the dimension of the part using the structured-light three-dimensional scanner.

Further still, in an embodiment, it may be advantageous to provide a measured stress state of a manufactured part as an input to the digital model to achieve a more accurate predicted frequency response. In this regard, the method may include receiving stress state information regarding the part as manufactured, where the stress state information is input to the digital model. The stress state information may be measured from the part using an x-ray diffraction inspection of the part. As such, the method may include measuring the stress state information of the part.

In addition, the method may include performing a resonance inspection of the part. The resonance inspection may include exciting the part at a plurality of input frequencies and obtaining a frequency response of the part at each of the plurality of input frequencies. Additionally, the method may include comparing the frequency response of the part to the resonance standard and characterizing the part as acceptable or unacceptable based on the comparing. The testing of the part may occur at the point of manufacture such that the part may be characterized in connection with the manufacturing process. The testing and evaluation of parts may be conducted on all parts produced by a process. Moreover, the testing may occur at the point of production or testing such that there is immediate feedback regarding the character of the parts produced.

In an embodiment, the part may be manufactured using an additive manufacturing technique. In this embodiment, the nominal specification may correspond to another part manufactured using a manufacturing technique other than additive manufacturing, and the characterizing may include determining whether the part conforms to a performance of the another part. For instance, the part may be a replacement part for the another part. That is, the part may correspond to a replacement part, where the nominal specification relates to the part to be replaced. As such, the resonance standard may be used to evaluate the part that is manufactured to determine if the part is an acceptable replacement part.

Furthermore, the method of the second aspect may include use of the resonance standard in the evaluation of manufacturing techniques. For instance, various manufacture techniques may be used to produce parts according to a common nominal specification. In turn, the parts may be evaluated relative to the resonance standard such that the manufacturing technique associated with part that most closely aligns with the resonance standard may be identified. In this regard, the method may include obtaining a first part and a second part each manufactured to the nominal specification corresponding to the digital model. The first part may be manufactured by a first manufacturing process and the second part manufactured by a second manufacturing process. In turn, the method may include performing a resonance inspection of the first part. The resonance inspection may include exciting the first part at a plurality of input frequencies and obtaining a first frequency response of the first part at each of the plurality of input frequencies. Moreover, the method may include performing the resonance inspection of the second part exciting the second part at the plurality of input frequencies and obtaining a second frequency response of the first part at each of the plurality of input frequencies. The method may include comparing the first frequency response and the second frequency response to the resonance standard to determine which of the first part or the second part comprises a frequency response that is most similar to the model resonance response corresponding to the resonance standard. In turn, the method may include identifying one of the first manufacturing process or the second manufacturing process for the manufacture of additional parts based on which corresponding one of the first frequency response or the second frequency response is most similar to the model resonance response corresponding to the resonance standard.

DETAILED DESCRIPTION

Figure 1:
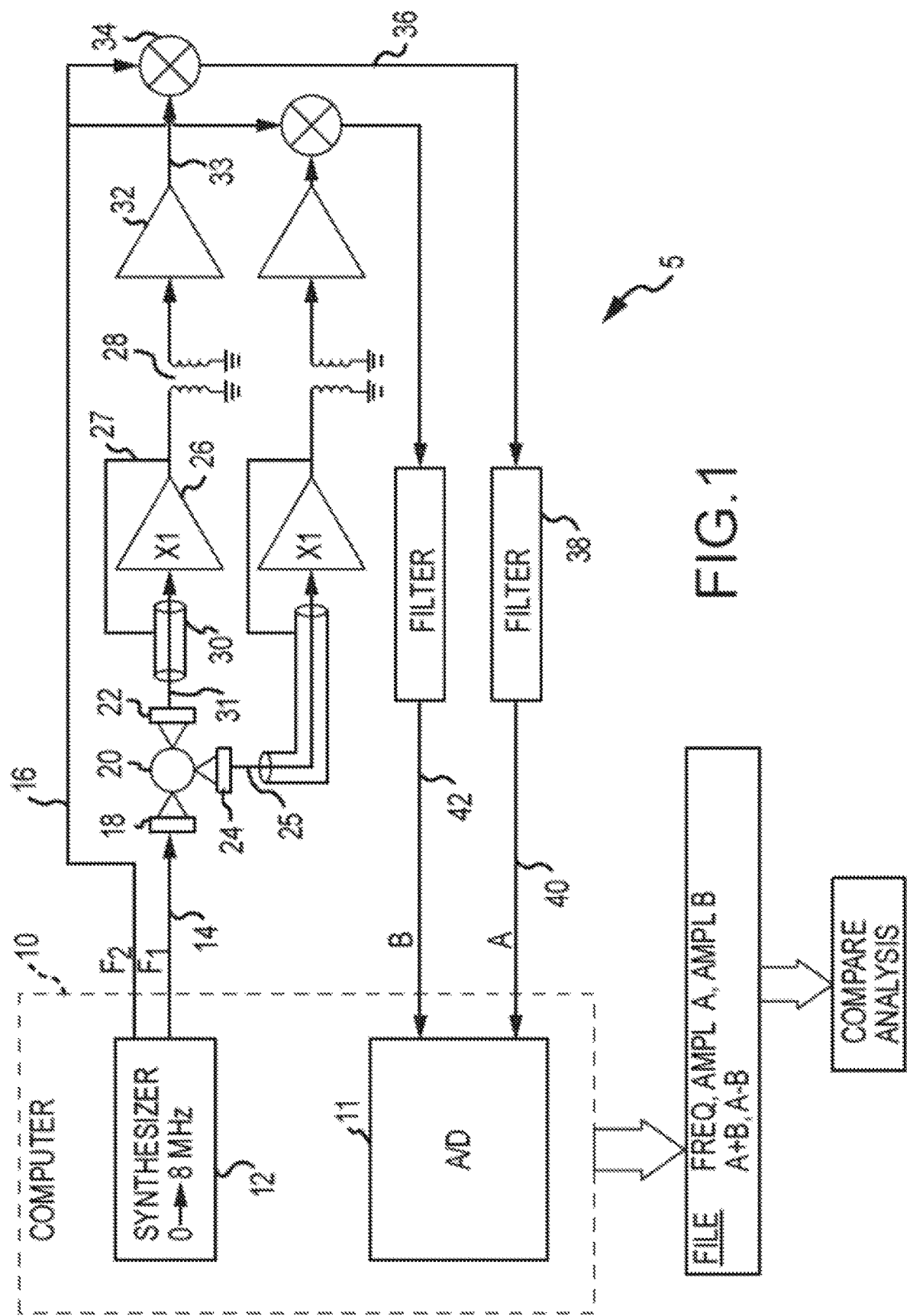
FIG. 1 is a block diagram of one embodiment of a resonance inspection tool.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 2:
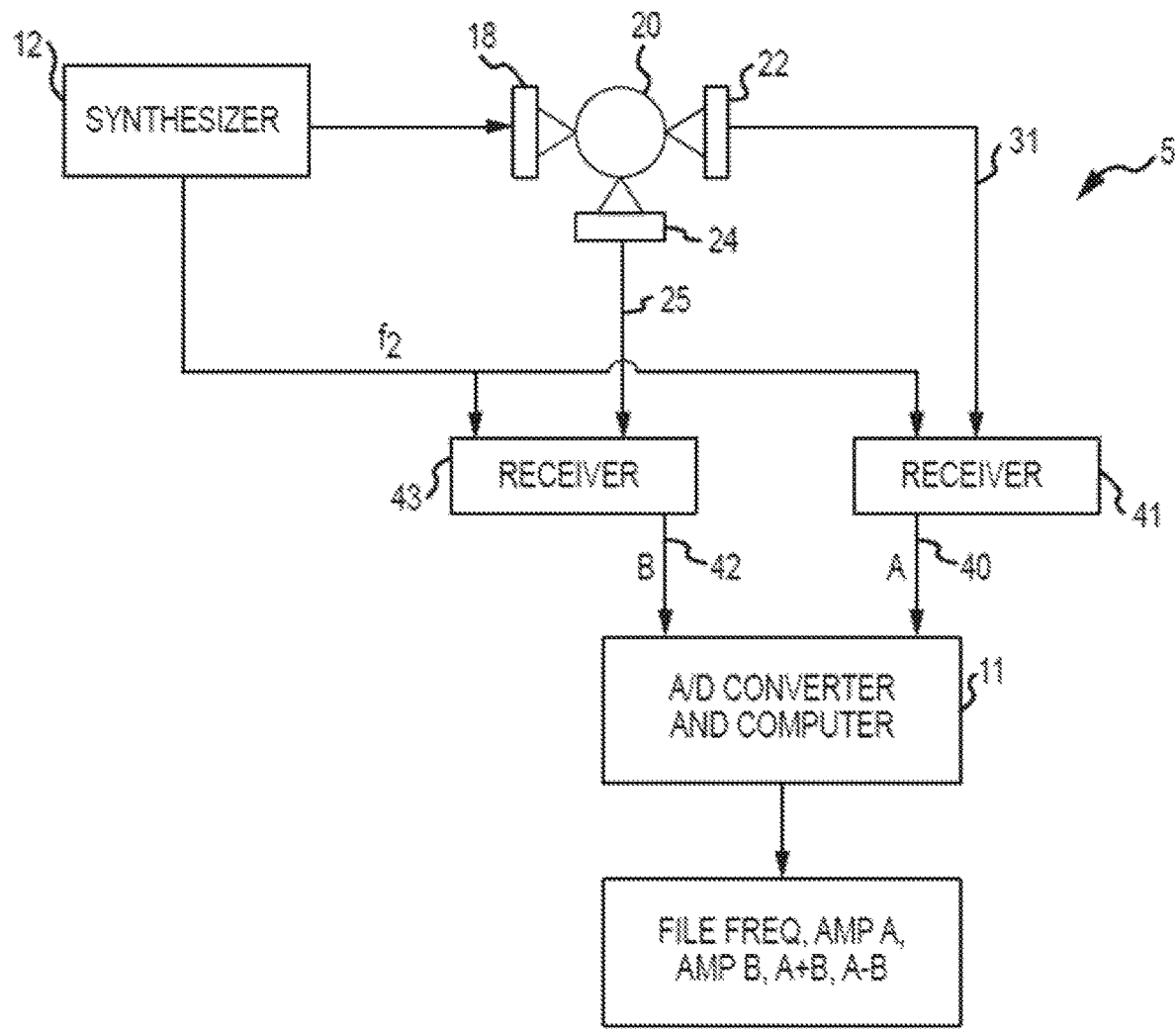
FIG. 2 shows a simplified block diagram of the resonance inspection tool of FIG. 1.

As will be appreciated in the discussion below, the present disclosure may generally involve performing a resonance inspection of one or more components. Accordingly, one embodiment of a resonance inspection tool or system (e.g., for performing resonant ultrasound spectroscopy measurement with a plurality of sensors) is illustrated in FIGS. 1 and 2 and is identified by reference numeral 5. While not the only means for performing a resonance inspection, the description of the resonance inspection tool 5 described herein may be utilized to perform a resonance inspection. The resonance inspection tool 5 includes a computer 10 that provides for control of a synthesizer 12 and an analog to digital converter 11 for each data input channel connected to each receiving or response transducer 22, 24 of the resonance inspection tool 5. Transducer 22 has an output on line 31, while transducer 24 has an output on line 25.

Synthesizer 12 may have a frequency range from greater than 0 to 20 MHz. Synthesizer 12 provides two outputs which are the frequency F1 at output 14 and a second output which is the frequency F2 at line 16. In one embodiment, the frequency F2 is either F1 plus a constant frequency such as 1000 Hz for heterodyne operation of the receiver, or at F1 for homodyne operation. A first transducer 18 (e.g., the input or driving transducer) is excited at a frequency F1 by synthesizer 12. Transducer 18 provides vibration (e.g., ultrasonic) to an object 20 to be tested via resonance inspection.

The response of the object 20 is then received by two separate output transducers 22 and 24. The circuitry from the output transducer 22 and A/D converter 11 can be identical to circuitry between output transducer 24 and A/D converter 11. For this reason, only the circuitry between output transducer 22 and A/D converter 11 will be discussed below. The times one (x1) amplifier 26 is connected to the output transducer 22, provides current for transformer 28 and has a feedback 27.

The output of transducer 22 is connected to a receiver 41 (FIG. 2). Receiver 41 is used for the purpose of providing amplification and noise rejection in the circuit between output transducer 22 and A/D converter 11. The output A (line 40) is applied to the A/D converter 11 within the computer 10. The A/D converter 11 provides an A/D conversion for each of lines 40 and 42. The converted information is then entered into a file, which, in an embodiment, consists of the measured frequency, the amplitude of A, the amplitude of B, the amplitude of A plus B, and/or the amplitude of A minus B. This file is then used for further analysis of the spectrum to determine characteristics of an object 20 being tested. In this regard, the file may comprise the frequency response of the object 20.

The times one (x1) amplifier 26 provides feedback to an inner coaxial cable shield 30 which surround the lead from transducer 22 to amplifier 26. Shield 30 is another grounded shield which can also be used for noise suppression. The outer surrounding coaxial cable is not shown in FIG. 1. If lead 31 is short, the shield 30 may be omitted because capacitance will not be too large. The purpose of the inner shield 30 is to provide cancellation of capacitance of the lead 31.

The transformer 28 may be a 4:1 step-down transformer used for impedance matching to the input of amplifier 32. In this regard, it should be noted that the output impedance of amplifier 26 may be much lower than the output impedance of transducer 22. This provides for the power gain and the necessary feedback to shield 30. The amplifier 32 may have a gain factor of 100:1 or a 40 db gain. Other gain factors may be appropriate. The amplifier 26 may be a broad-band amplifier having a bandpass on the order of 50 MHz.

Mixer 34 has an output signal (e.g., a 1 KHz signal) having a magnitude which is proportional to the magnitude of the frequency F1 provided on line 14 from synthesizer 12. The function of the synthesizer 12 is to provide a point-by-point multiplication of instantaneous values of inputs on lines 16 and 33. The mixer 34 also has many high-frequency output components which are of no interest. The high-frequency components are therefore filtered out by the low-bandpass filter 38 which is connected to mixer 34 by line 36. Filter 38 serves to clean-up the signal from mixer 34 and provide a voltage on line 40 which is only the output signal at an amplitude which is proportional to the amplitude of the output 31 of transducer 22.

Operation of the resonance inspection tool 5 will be briefly described in relation to measurement steps performed by measurement of the output of either transducer 22 or transducer 24 controlled by computer 10. A measurement cycle may be initiated and provides initialization for the frequency F and the desired frequency step. The frequency step may be 1 Hz or any other frequency selected for the measurement. Although a constant frequency step may be utilized, the frequency step may be determined by any appropriate algorithm. In one embodiment, the frequency step is determined by determining the start frequency and the stop frequency and dividing the frequency difference by the number of steps desired for the measurement. In any case, the synthesizer 12 is configured to provide a plurality of input or drive frequencies to transducer 18.

Once a signal is picked up by the receiver (i.e., an output on line 33), a pause for ring delay may be provided. The pause for ring delay may be on the order of 30 milliseconds, although other ring delays can be used if the object under test 20 has resonances that are narrower than a few Hertz. The purpose of the pause is to give the object 20 an opportunity to reach its steady state magnitude in response to a steady input from transducer 18. The pause time is time after the frequency is applied and before detection is initiated.

After the ring delay is complete, analog-to-digital converter 11 provides an output that can be used by the data recording computer. The output of the A/D conversion is then written to a file by the computer 10 for the purpose of analysis of the data by another program. Data comprising the unique signature or characterizing of the object 20 (i.e., the frequency response of the object 20) is written into file as it is created. Once information is entered into file, subsequent processing can be used to generate a signature or characterize the object 20 such as the resonant magnitudes, the sum of resonant magnitudes, the difference of resonant magnitudes, or other manipulations of the multiple channel multiple frequency measurement which is used to perform the unique signature of the object 20. The magnitude of the outputs at each sensor location for each resonance frequency may be compared.

Figure 3:
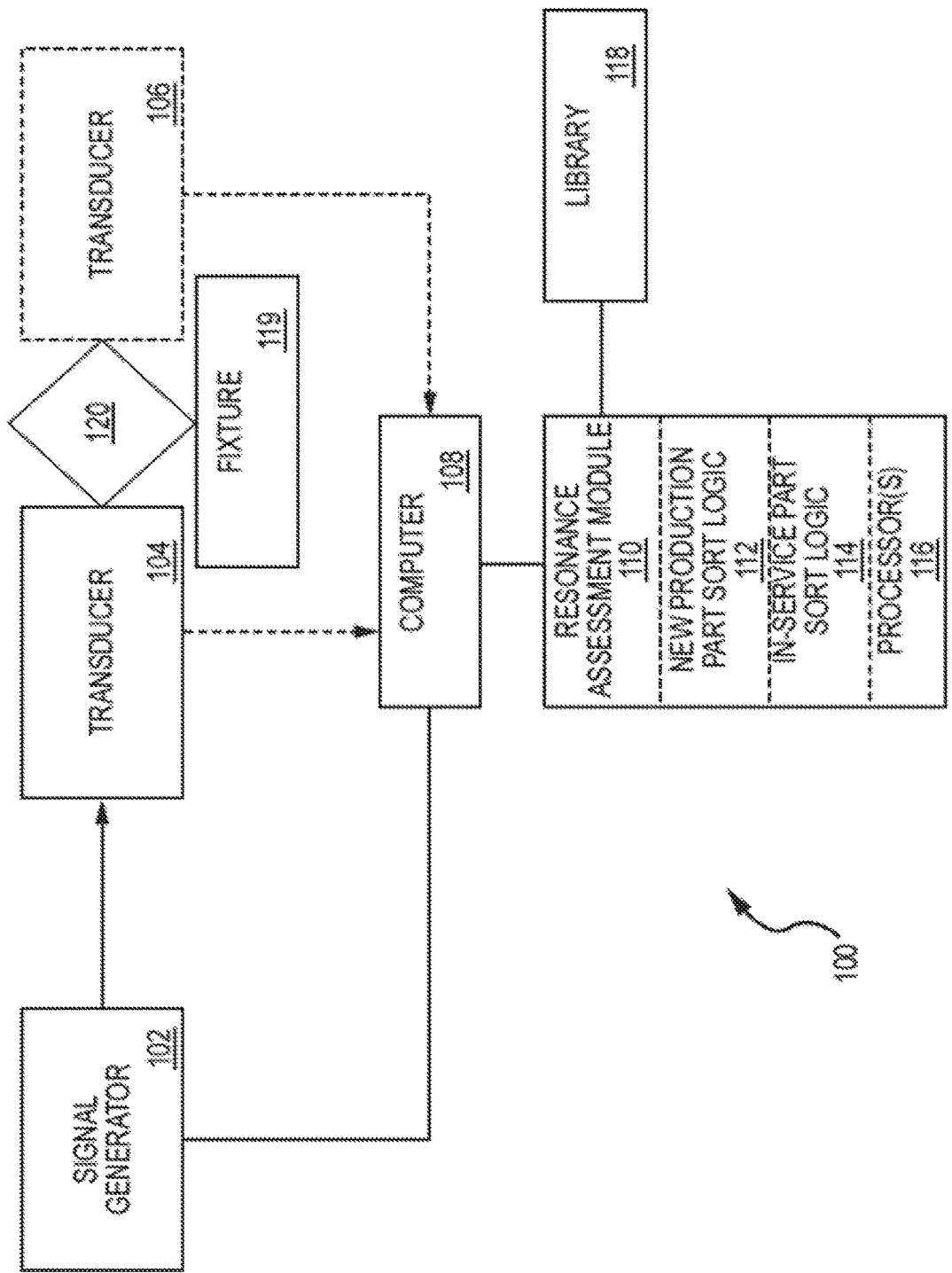
FIG. 3 is a block diagram of another embodiment of a resonance inspection tool.

Another embodiment of a resonance inspection tool or system is illustrated in FIG. 3 and is identified by reference numeral 100. The resonance inspection tool 100 may be used to assess a part or part-under-test (PUT) 120. This part 120 may be retained in a fixture 119 in any appropriate manner for the execution of a resonance inspection.

The resonance inspection tool 100 includes a signal generator 102 of any appropriate type, at least one transducer (e.g., transducer 104), and a computer 108. The transducer 104 may be of any appropriate type. In one embodiment, the transducer 104 is in physical contact with the part 120 throughout the execution of the inspection of the part 120, and in this case, may be characterized as being part of the fixture 119 for the part 120. Another embodiment has the transducer 104 being maintained in spaced relation to the part 120 throughout the execution of the resonance inspection of the part 120 (e.g., a laser, such as Nd:YAG lasers, TEA $CO_2$ lasers, excimer lasers, or diode lasers).

The computer 108 may include what may be characterized as a resonance assessment module 110. Generally, the resonance assessment module 110 may be configured to evaluate the results of a resonance inspection, for instance for purposes of determining whether the part 120 should be accepted or rejected by the resonance inspection tool 100, determining whether the part 120 is at an end-of-life state or condition, or the like. A part 120 that is "accepted" by the resonance inspection tool 100 may mean that the resonance inspection tool 100 has determined that the part 120 may be put into service (e.g., utilized for its intended purpose(s) and/or used according to its design specifications). Such a part 120 may be characterized by the resonance inspection tool 100 as "good" or "acceptable." In one embodiment, a part 120 that has been accepted by the resonance inspection tool 100 means that the tool 100 has determined that the part 120 is free of defects, is not in an end-of-life condition or state, is aging normally, or any combination thereof. A part 120 that is "rejected" by the resonance inspection tool 100 may mean that the resonance inspection tool 100 has determined that the part 120 should not be put into service (e.g., should not be utilized for its intended purpose(s) and/or should no longer be used according to its design specifications). In one embodiment, a part 120 that has been rejected by the resonance inspection tool 100 means that the tool 100 has determined that the part 120 includes at least one defect, is at or near an end-of-life condition or state, is aging abnormally, or any combination thereof. Such a part 120 may be characterized as "bad" or "unacceptable." A part 120 that is analyzed or assessed by the resonance inspection tool 100 may be of any appropriate size, shape, configuration, type, and/or class.

The signal generator 102 generates signals that are directed to the transducer 104 for transmission to the part 120 in any appropriate manner/fashion (e.g., via physical contact between the transducer 104 and the part 120; through a space between the transducer 104 and the part 120). Signals provided to the transducer 104 by the signal generator 102 are used to excite the part 120 mechanically (e.g., to provide energy to the part 120 for purposes of inducing vibration). Multiple frequencies may be input to the part 120 through the transducer 104 in any appropriate manner. This may be characterized as "sweeping" through a range of frequencies that are each input to the part 120, and this may be done in any appropriate manner for purposes of the resonance inspection tool 100. Any appropriate number/range of frequencies may be utilized, and any appropriate way of progressing through a plurality of frequencies (e.g., a frequency range) may be utilized by the resonance inspection tool 100.

In one embodiment, at least one other transducer 106 is utilized in the resonance inspection of the part 120 using the resonance inspection tool 100 of FIG. 3, including where two transducers 106 are utilized (e.g., in accordance with the embodiment of FIGS. 1 and 2 noted above). Each of the transducers 106, as well as the input or drive transducer 104, may be in physical contact with the part 120. It may be such that the part 120 is in fact entirely supported by the transducer 104 and any additional transducers 106 (e.g., the drive transducer 104 and one or more receive transducers 106 may define the fixture 119). Each transducer 106 that is utilized by the resonance inspection tool 100 is used to acquire the frequency response of the part 120 to the frequencies input to the part 120 by the drive transducer 104, and therefore each transducer 106 may be characterized as an output or receiver transducer 106.

One or more transducers 106 utilized by the resonance inspection tool 100 may be maintained in physical contact with the part 120 throughout the resonance inspection. Another option is for one or more of the transducers 106 to be maintained in spaced relation with the part 120 throughout the resonance inspection. A transducer 106 in the form of a laser may be maintained in spaced relation with the part throughout the resonance inspection and may be utilized to obtain the frequency response of the part 120. Representative lasers that may be utilized as a transducer 106 by the resonance inspection system 100 include without limitation Nd:YAG lasers, TEA $CO_2$ lasers, excimer lasers, or diode lasers. In one embodiment, the frequency response of the part 120 is acquired by laser vibrometry utilizing at least one transducer 106. A given transducer 106 in the form of a laser may acquire resonance data on the part 120 from a single location, or a given transducer 106 in the form of a laser could acquire resonance data on the part 120 by scanning the laser over multiple locations on the part 120.

Another embodiment of the resonance inspection tool 100 of FIG. 3 utilizes only the transducer 104. That is, no additional transducers 106 are utilized by the resonance inspection tool 100 in this case, and therefore the transducer 106 is presented by dashed lines in FIG. 3. In this case, the transducer 104 is used to input a drive signal to the part 120 (e.g., to excite the part 120 at a plurality of different frequencies), and is also used to acquire the frequency response of the part 120 to these input drive frequencies. Representative configurations for this drive/receive transducer configuration 104 include without limitation piezoceramic, piezocomposites, piezoelectric quartz crystal, and other electromechanical materials.

In the above-noted drive/receive transducer configuration 106, a first drive signal at a first frequency (from the signal generator 102) may be transmitted to the part 120 through the transducer 104, the transmission of this first drive signal may be terminated, and the transducer 104 may be used to acquire a first frequency response of the part 120 to this first drive signal (including while a drive signal is being transmitted to the part 120). The signal generator 102 may also be used provide a second drive signal at a second frequency to the transducer 104, which in turn transmits the second drive signal to the part 120, the transmission of this second drive signal may be terminated, and the transducer 104 may once again be used to acquire a second frequency response of the part 120 to this second drive signal (including while a drive signal is being transmitted to the part 120). This may be repeated any appropriate number of times and utilizing any appropriate number of frequencies and frequency values. One or more drive signals may be sequentially transmitted to the part 120 by the signal generator 102 and transducer 104, one or more drive signals may be simultaneously transmitted to the part 120 by the signal generator 102 and transducer 104, or any combination thereof.

The frequency response of the part 120 is transmitted to the computer 108 of the resonance inspection tool 100 of FIG. 3. This computer 108 may be of any appropriate type and/or configuration, and is used by the resonance inspection tool 100 to evaluate the part 120 in at least some fashion (e.g., to determine whether to accept or reject the part 120). Generally, the part 120 is vibrated by the transducer 104 according to a predetermined signal(s), and the part 120 is evaluated by the resulting vibrational (e.g., whole body) response of the part 120. For instance, this evaluation may entail assessing the part 120 for one or more defects of various types, assessing whether the part 120 is at or near the end of its useful, life, assessing whether the part 120 is aging normally or abnormally, or any combination thereof.

The computer 108 may incorporate and utilize the above-noted resonance assessment module 110 to evaluate the response of the part 120 to a resonance inspection. The resonance assessment module 110 may be of any appropriate configuration and may be implemented in any appropriate manner. In one embodiment, the resonance assessment module 110 includes at least one new production part sort logic 112 (e.g., logic configured to determine whether to accept or reject new production parts), at least one in-service part sort logic 114 (e.g., logic configured to determine whether to accept or reject in-service parts), along with one or more processors 116 of any appropriate type and which may be implemented in any appropriate processing architecture. The assessment of the response of the part 120 to the input drive signals may entail comparing the response to a library 118 utilized by the resonance inspection tool 100. This library 118 may be stored on a computer-readable storage medium of any appropriate type or types, including without limitation by using one or more data storage devices of any appropriate type and utilizing any appropriate data storage architecture. The library 118 may include a resonance standard for a part, which may be generated in any appropriate manner including by way of testing a population of parts or by way of a model-based approach as described above.

Figure 4:
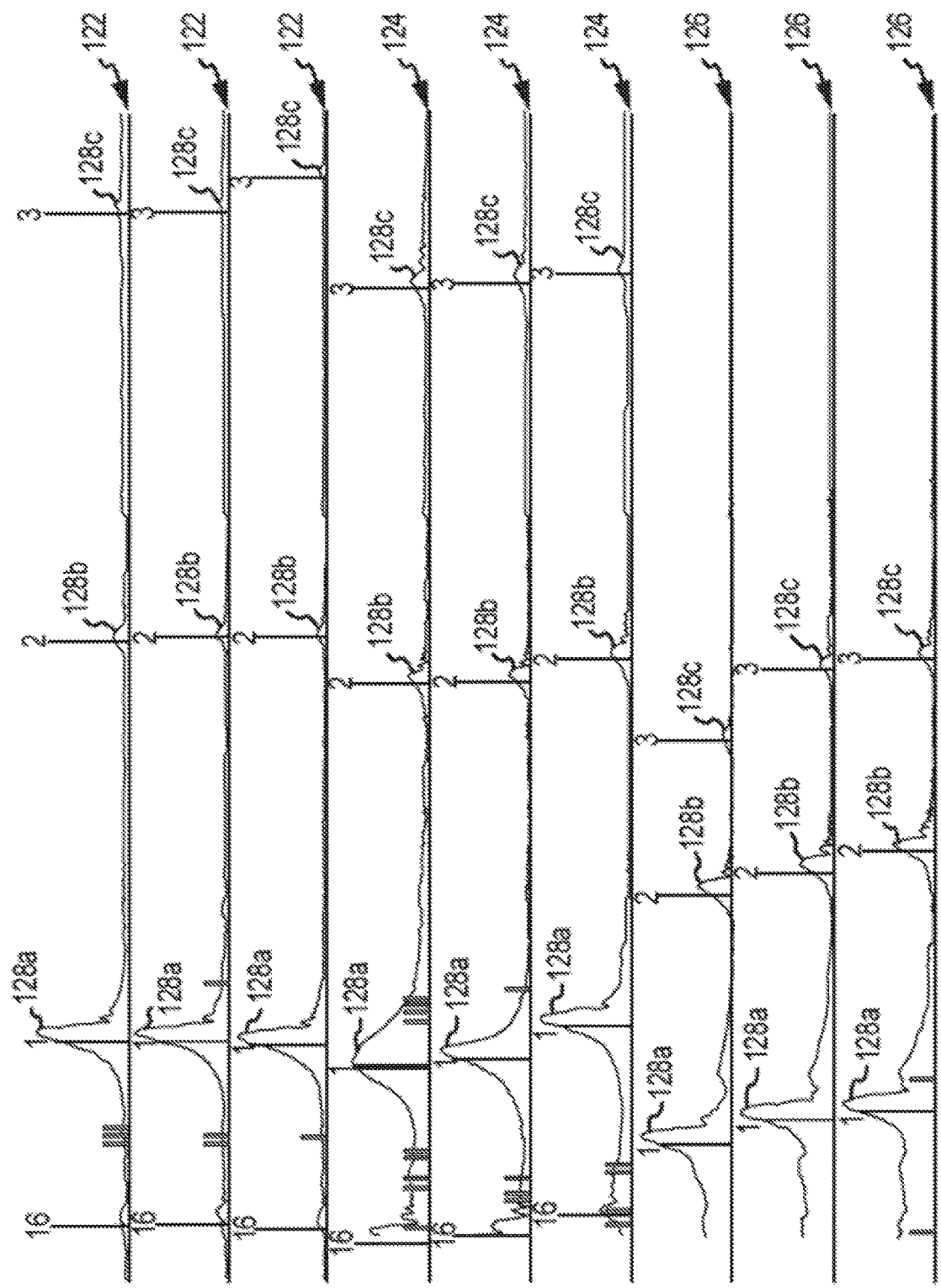
FIG. 4 presents various resonance inspection results of parts that may be included in the library utilized by the resonance inspection tool of FIG. 3.

The library 118 of the resonance inspection tool 100 may include various types of resonance inspection results to allow the resonance inspection tool 100 to assess a part 120. Generally, the resonance inspection results from the part 120 are compared with data in the library 118 from at least one other part that is the same as the part 120 in one or more respects (e.g., a part 120 in the form of a turbine blade will be compared to turbine blade data in the library 118; a part 120 in the form of a turbine blade will not be compared with ball bearing data in the library 118). Representative resonance inspection results are presented in FIG. 4, and are of a type that may be included in the library 118. The three spectra 122 shown in FIG. 4 represent the frequency response of a new production part 120 to a certain input frequency, and where this new production part 120 has been accepted by the resonance inspection tool 100. Note how the three peaks 128a, 128b, and 128c differ in at least one respect between the various spectra 122, but yet the corresponding new production part 120 is acceptable in all three instances.

The three spectra 124 shown in FIG. 4 represent the frequency response of an in-service production part 120 to a certain input frequency, and where this in-service part 120 has been accepted by the resonance inspection tool 100. Note how the three peaks 128a, 128b, and 128c in the spectra 124 differ in at least one respect from the corresponding peaks 128a, 128b, and 128c in the spectra 122 (again, associated with a new production part 120).

The three spectra 126 shown in FIG. 4 represent the frequency response of an in-service production part 120 to a certain input frequency, and where this in-service part 120 has been rejected by the resonance inspection tool 100. Note how the three peaks 128a, 128b, and 128c in the spectra 126 differ in at least one respect from the corresponding peaks 128a, 128b, and 128c in the spectra 124 (again, associated with an in-service part 120 that the resonance inspection tool 100 would accept). Generally, each of the peaks 128a, 128b, and 128c in the spectra 126 has shifted to the left compared to the corresponding peaks 128a, 128b, and 128c in the spectra 122 and 124. Moreover, note the "compression" between the peaks 128a, 128b in the spectra 126 compared to the spectra 122, 124, as well as the "compression" between the peaks 128b, 128c in the spectra 126 compared to the spectra 122, 124.

Figure 5:
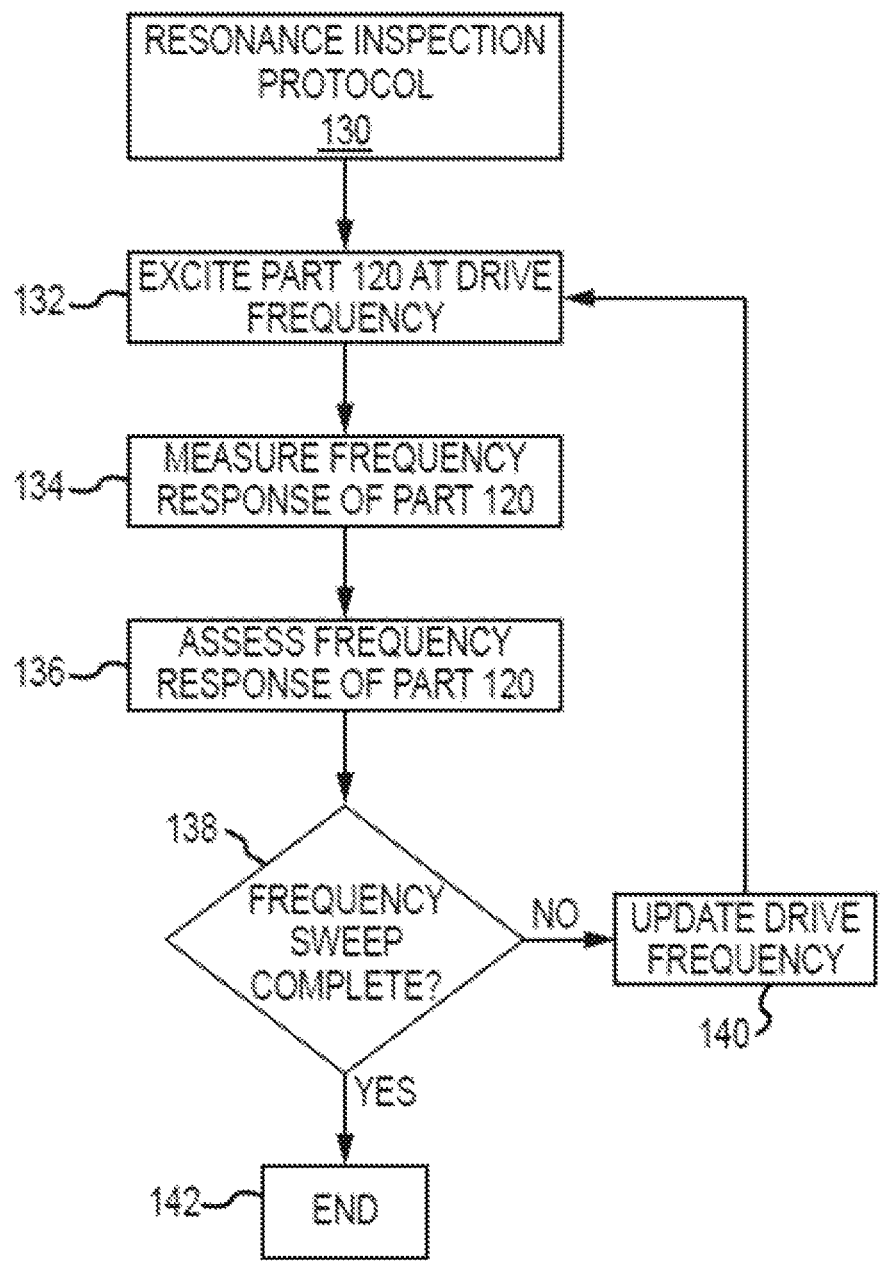
FIG. 5 is one embodiment of a resonance inspection protocol that may be utilized by a resonance inspection tool.

One embodiment of a resonance inspection protocol that may be utilized by the resonance inspection tool 100 of FIG. 3 is presented in FIG. 5 and is identified by reference numeral 130. Step 132 of the resonance inspection protocol 130 is directed to exciting a part 120 at a drive frequency (e.g., via a signal from the signal generator 102 that is input to the part 120 through the transducer 104). The response of the part 120 is obtained or measured pursuant to step 134 (e.g., via one or more transducers 106; via the transducer 104 in a single transducer configuration). It should be appreciated that steps 132 and 134 may be executed in at least partially overlapping relation (e.g., the frequency response of the part 120 could be obtained as a drive signal is being applied to the part 120), although steps 132 and 134 could be sequentially executed as well.

The frequency response of the part 120 is assessed pursuant to step 136 of the resonance inspection protocol 130. Step 138 of the protocol 130 is directed to determining if the frequency sweep is complete—whether each of the desired drive frequencies has been input to the part 120. If not, the protocol 130 proceeds to step 140, and which is directed to updating or changing the drive frequency to be input to the part 120. Control is then returned to step 132 of the protocol 130 for repetition in accordance with the foregoing. Once the part 120 has been driven at each of the desired frequencies, the protocol 130 may be terminated pursuant to step 142.

Step 136 of the resonance inspection protocol 130 is again directed to assessing the response (e.g., frequency; whole body) of the part 120 (e.g., using the sort logic 112 or 114 and/or comparing the response of the part 120 to the library 118 of the resonance inspection tool 100). This assessment may be undertaken at any appropriate time and in any appropriate manner. For instance, the assessment associated with step 136 could be undertaken while the part 120 continues to be driven by a signal at one or more frequencies. Another option is for the assessment provided by step 136 to be undertaken only after all drive signals have been input to the part 120 (step 132) after all the frequency responses have been obtained (step 134) or both.

Figure 6:
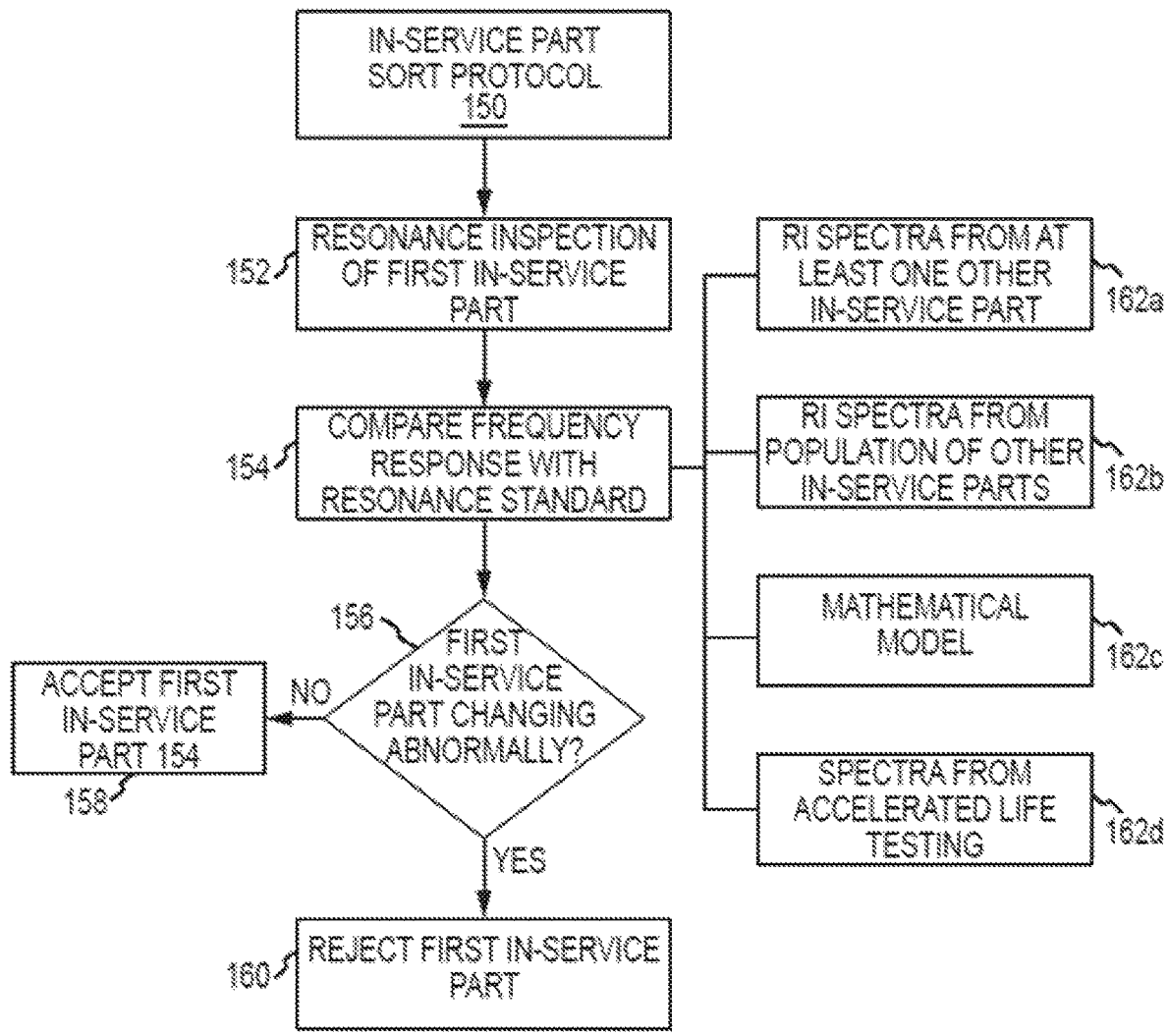
FIG. 6 is one embodiment of a sort protocol for in-service parts that may be utilized by a resonance inspection tool.

One embodiment of a sort protocol for in-service parts is presented in FIG. 6 and is identified by reference numeral 150. The sort protocol 150 may be utilized by the in-service part sort logic 114 of the resonance inspection tool 100 shown in FIG. 3 and is configured for the assessment of in-service parts. Generally, the sort protocol 150 is directed to determining whether or not an in-service part is experiencing normal changes while in service. Stated differently, the sort protocol 150 may be characterized as being directed to determining whether an in-service part is aging normally or abnormally and via a resonance inspection. Each resonance inspection of an in-service part may be conducted while the in-service part remains in an installed state or condition (e.g., in situ) for purposes of the sort protocol 150. Alternatively, each resonance inspection of an in-service part may be conducted with the in-service part being in an uninstalled state or condition (e.g., after having been removed from an assembly incorporating the same) for purposes of the sort protocol 150.

A resonance inspection of a first in-service part (e.g., part 120 shown in FIG. 3) is conducted pursuant to step 152 of the sort protocol 150 of FIG. 6 (e.g., via execution of the resonance inspection protocol 130 of FIG. 5). The frequency response of the first in-service part is compared with a resonance standard pursuant to step 154. This "resonance standard" may be incorporated by the library 118 used by the resonance inspection tool 100 (FIG. 3) and/or may be utilized by the in-service part sort logic 114, and in any case may characterize or define what should be a "normal change" for a predetermined in-service part (e.g., to determine whether the first in-service part is changing or aging in a normal manner or fashion). That is, the comparison of step 154 is undertaken for purposes of determining whether the first in-service part is changing normally or abnormally (step 156). If the comparison with the resonance standard (step 154) determines that the first in-service part is changing abnormally, the sort protocol 150 proceeds from step 156 to step 160. A first in-service part that is changing abnormally may be rejected by the sort protocol 150 pursuant to step 160 (e.g., the first in-service part may be designated to be taken out of service). A first in-service part that is changing normally is accepted by the sort protocol 150 pursuant to step 158 (e.g., the first in-service part may be returned to service).

The resonance standard associated with step 154 may include actual and/or projected/predicted resonance inspection results. Moreover, these resonance inspection results may be from various points in time over the life cycle of a part (e.g., resonance inspection results when in the form of a new production part, resonance inspection results at or associated with 5,000 cycles of usage, resonance inspection results at or associated with 10,000 cycles of usage, resonance inspection results at or associated with 15,000 cycles of usage, and so forth). Step 156 of the sort protocol 150 may or may not take usage data (e.g., hours or cycles of operation) into account when assessing a particular in-service part. For instance, step 156 could be configured so that resonance inspection results from the in-service part being assessed via the sort protocol 150 would have to "match" data in the resonance standard having the same or comparable usage data (e.g., if the in-service part that was being assessed via the sort protocol 150 was at 10,000 cycles of usage, step 156 could be configured such that resonance inspection results from this in-service part would have to match data in the resonance standard that are also associated with 10,000 cycles of usage). Step 156 could also be configured so that resonance inspection results from the in-service part being assessed via the sort protocol 150 would only need to "match" data in the resonance standard, regardless of any associated usage data (e.g., step 156 could be configured to determine that a part at 10,000 cycles was normally changing, even though its resonance inspection results "matched" data in the resonance standard that was in fact associated with 20,000 cycles).

The resonance standard associated with step 154 of the sort protocol 150 of FIG. 6 may be of various forms. Representative resonance standards are shown in FIG. 6. The resonance standard for step 154 may be in the form of 1) spectra from one or more other in-service parts (e.g., spectra from a resonance inspection previously conducted on one or more in-service parts other than that being inspected pursuant to the sort protocol 150 (box 162a); 2) one or more spectra from a population of other in-service parts (box 162b); 3) resonance inspection results predicted and/or derived via mathematical modeling (box 162c); and 4) spectra obtained from accelerated life testing (box 162d).

The resonance standard associated with step 154 of the sort protocol 150 could be in the form of any one or more of the type of spectra 124 shown in FIG. 4 (e.g., box 162*a*). If the resonance inspection results from the resonance inspection conducted pursuant to step 152 matched or complied with any of these spectra 124 in one or more respects, the in-service part could be accepted by step 158 of the sort protocol 150.

The resonance standard used by step 154 of the sort protocol 150 may be based upon a population of in-service parts (box 162*b*). This population of in-service parts does not need to include the first in-service part that is being assessed by the sort protocol 150. The population of in-service parts may be viewed as a "peer group" for purposes of assessing the first in-service part via the sort protocol 150 (e.g., other parts manufactured in accordance with common specifications and/or that are functionally interchangeable with the first in-service part). For instance, the resonance standard may be in the form of spectra (e.g., spectra 124 from FIG. 4) from each of a plurality of in-service parts that are within the population. If the comparison of step 154 determines that the resonance inspection results from the first in-service part (step 152) match or comply with any of these spectra from the population in one or more respects, the first in-service part may be accepted pursuant to step 158 of the sort protocol 150. The resonance standard associated with step 154 may also be in the form of an average of spectra from each of a plurality of in-service parts that are within the noted population. If the comparison of step 154 determines that the resonance inspection results (step 152) match or comply with this spectral average from the population in one or more respects, the first in-service part may be accepted pursuant to step 158 of the sort protocol 150.

The resonance standard associated with step 154 of the sort protocol 150 may also be provided by mathematical modeling (box 162*c*). This mathematical modeling may be used to generate resonance inspection results for various times over the life of a part that is normally changing. If the comparison of step 154 determines that the resonance inspection results (step 152) match or comply with any of these mathematically derived resonance inspection results in one or more respects, the first in-service part may be accepted pursuant to step 158 of the sort protocol 150.

The resonance standard associated with step 154 of the sort protocol 150 may also be provided by accelerated life testing (box 162*d*). Resonance inspection results may be acquired as a part undergoes accelerated life testing, and these resonance inspection results may be used by the resonance standard associated with step 154. If the comparison of step 154 determines that the resonance inspection results (step 152) match or comply with any of the resonance inspection results acquired during the accelerated life testing in one or more respects, the first in-service part may be accepted pursuant to step 158 of the sort protocol 150.

Figure 7:
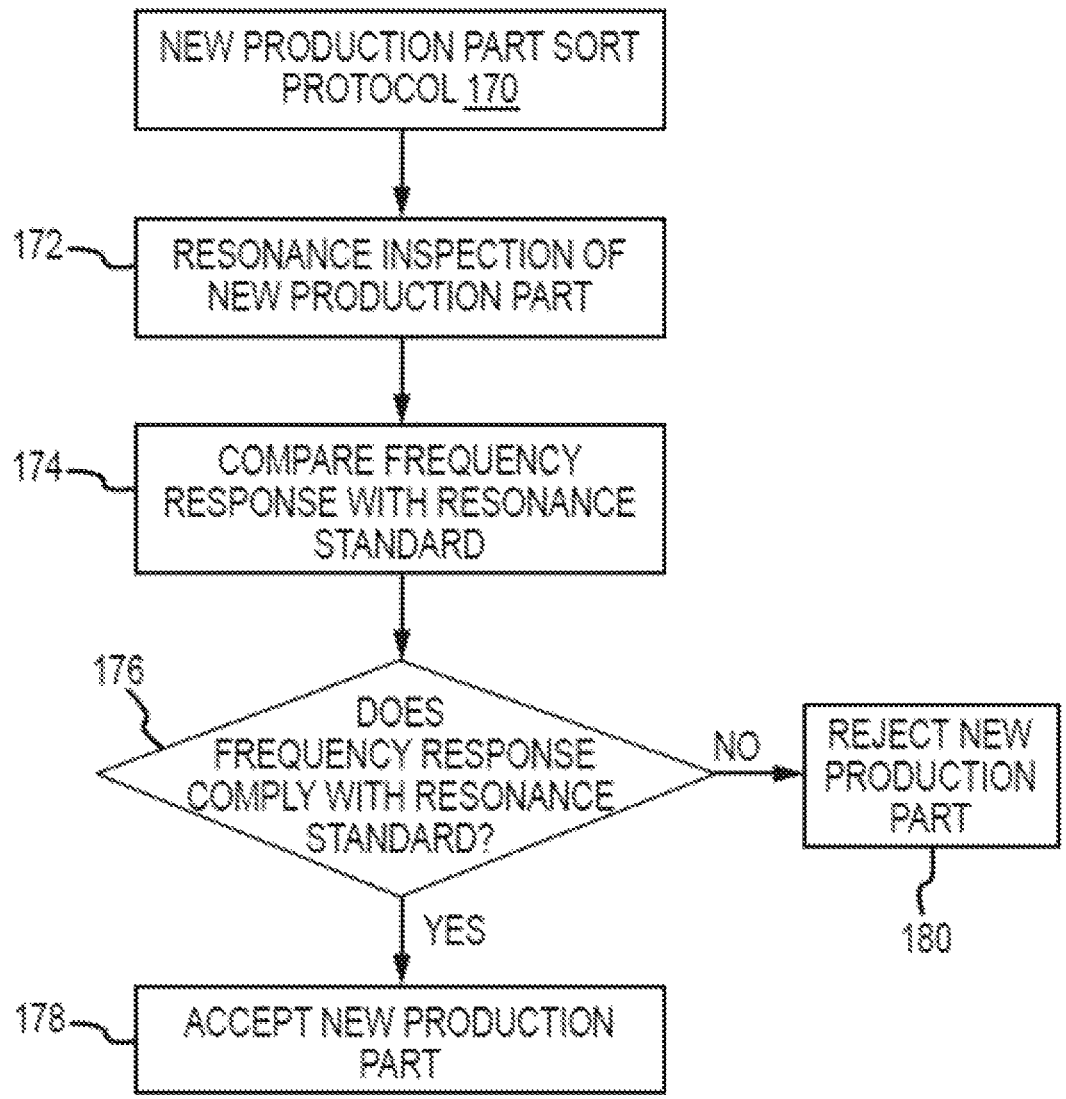
FIG. 7 is one embodiment of a sort protocol for new production parts that may be utilized by a resonance inspection tool.

One embodiment of a sort protocol for new production parts is presented in FIG. 7, is identified by reference numeral 170, and may be used by the resonance inspection tool 100 of FIG. 3. A resonance inspection of a new production part (e.g., part 120 shown in FIG. 3) is conducted pursuant to step 172 of the sort protocol 170 of FIG. 7 (e.g., via execution of the resonance inspection protocol 130 of FIG. 5). The frequency response of the new production part is compared with at least one resonance standard pursuant to step 174. Each such resonance standard may be incorporated by the library 118 used by the resonance inspection tool 100 (FIG. 3) and/or may be utilized by the new production part sort logic 112, and in any case, may characterize or define what should be a "normal" new production part. That is, the comparison of step 174 is undertaken for purposes of determining whether the new production part is "normal" (step 176). A new production part that does not comply with the relevant resonance standard(s) may be rejected by the sort protocol 170 pursuant to step 180 (e.g., the new production part may be designated for scrapping). A new production part that complies with the relevant resonance standard(s) is accepted by the sort protocol 170 pursuant to step 178 (e.g., the new production part may be designated for service).

Figure 8:
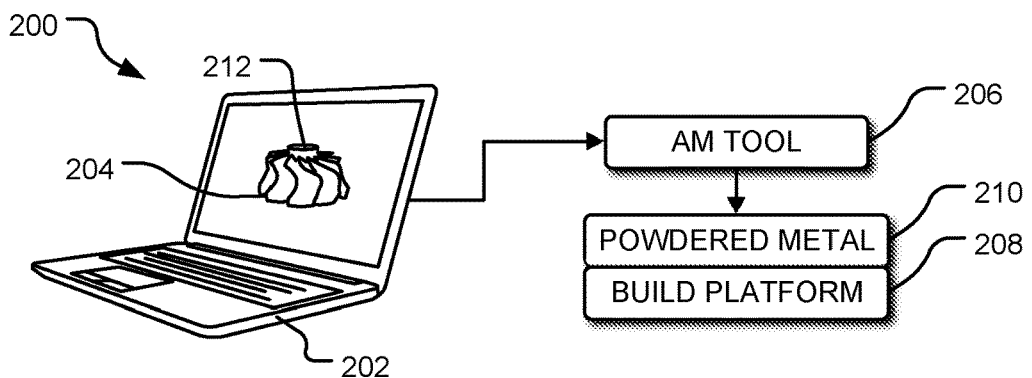
FIG. 8 is one embodiment of an AM system that may be used to manufacture parts.

As described above, the present disclosure may be used in the context of the evaluation of parts made by way of additive manufacturing (AM). AM techniques have been developed that allow for the manufacture of parts by way of computer control of a process that allows for material to be deposited for the formation of a part. With further reference to FIG. 8, an AM system 200 is shown in schematic form. Generally, the AM system 200 may include a computer 202 that may comprise a three-dimensional digital model 204 of a part 212 that is to be manufactured by the AM system 200. For instance, the computer 202 may utilize a computer-assisted design (CAD) program that allows for generation and/or manipulation of the digital model 204 of the part 212. The digital model 204 may represent a nominal specification of the part 212 to be manufactured. That is, the digital model 204 may represent an idealized version of the part 212 with nominal dimensions that may be subject to various levels of variability in the physically manufactured part subject to tolerances of the design and/or AM system 200.

The digital model 204 may be used by the computer 202 to generate instructions that may be provided to an AM tool 206 of the AM system 200. The AM tool 206 may be any appropriate tool capable of generating a three-dimensional part 212 by way of an AM process. Examples of potential AM processes that may be performed by the AM tool 206 may include binder jetting, directed energy deposition, material extrusion, material jetting, powder bed fusion, sheet lamination, and vat photopolymerization. Additionally, a variety of materials may be used in connection with the AM process including, without limitation, polymers, metals, or other appropriate material that may be used in an AM process. Some particularly contemplated AM processes include direct metal laser sintering (DMLS), selective laser melting, and electron beam melting. These approaches generally involve a technique using powder bed fusion, which will be described herein as an example. However, it may be appreciated that the techniques described may generally be applicable to any AM process.

In this regard, the AM system 200 may include a build platform 208 upon which the part 212 is to be manufactured. The build platform 208 may, in at least one embodiment, be covered in a powdered metal 210. The AM tool 206 may selectively apply energy to the powdered metal 210 to solidify (e.g., melt or sinter) the metal to form the part 212. The AM tool 206 may include a computer-controlled machine head that may apply energy selectively to the powder bed to solidify selected areas of the powdered metal 210 to form a layer of the part 212. In turn, the build platform 208 may be moved (e.g., lowered or raised), the powdered metal 210 may be applied or arranged on the build platform, and a new layer of the part 212 may be formed by the AM tool 206. As such, it may be appreciated that a part 212 may, in turn, be produced on the build platform 208 in layers in which the powdered metal 210 is selectively solidified to form the part 212.

Figure 9:
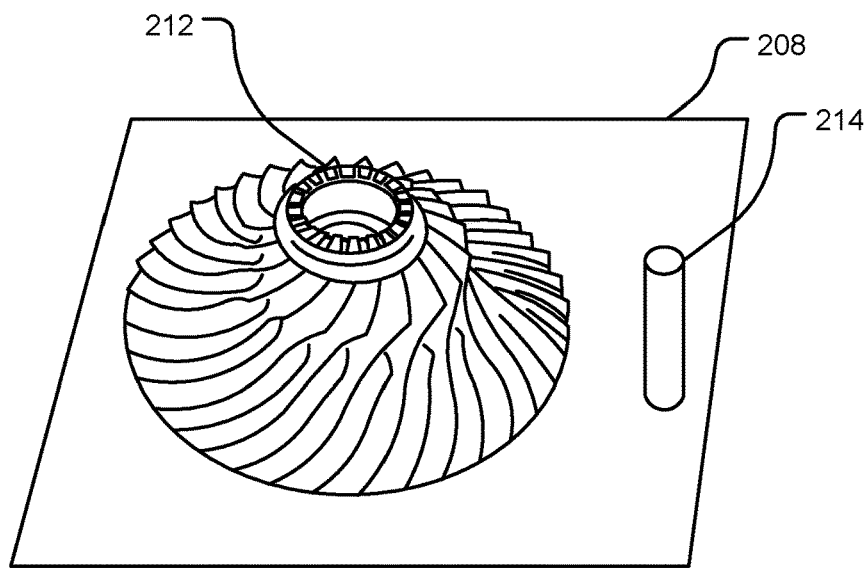
FIG. 9 is one embodiment of a build platform of an AM system having a part and a witness coupon manufactured thereon.

With further reference to FIG. 9, a depiction of a part 212 that has been manufactured using the AM system 200 on the build platform 208 is shown. A witness coupon 214 may be manufactured concurrently with the part 212. In this regard, the witness coupon 214 and the part 212 may be manufactured at substantially the same time, by the same tooling, and using substantially the same material. Accordingly, the part 212 and the witness coupon 214 may share one or more substantially similar properties such as one or more material properties by virtue of the concurrent manufacture of the part 212 and witness coupon 214. As may be appreciated, the witness coupon 214 may comprise a relatively simple geometry such as a simple parallelepiped or a right cylinder. Other witness coupon 214 geometries may be provided without limitation. Moreover, while a witness coupon 214 is described herein in the context of an AM system 200, it may be appreciated that the techniques described herein may generally be applicable to any manufacturing process in which properties of a part may be derived from a witness coupon including traditional manufacturing techniques such as forging, milling, casting, or the like.

Figure 10:
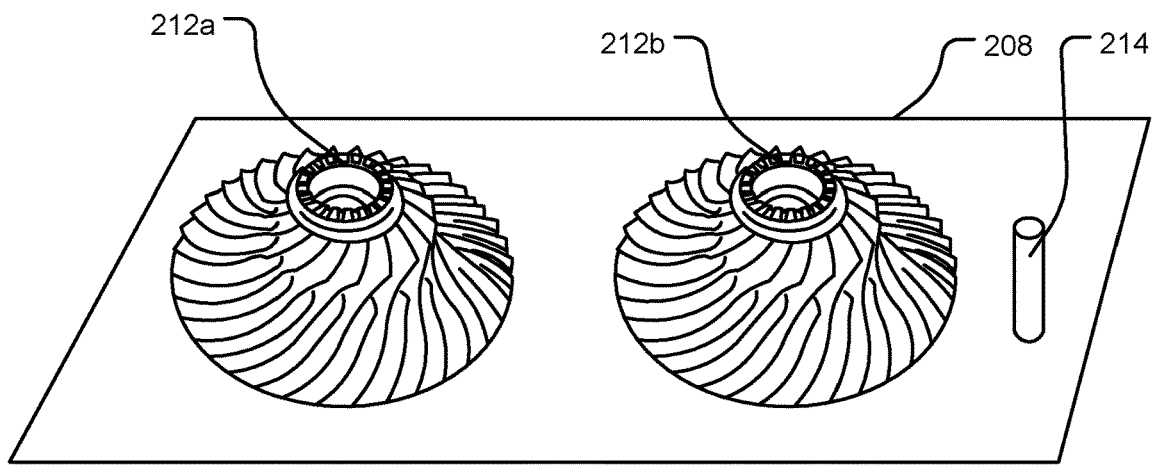
FIG. 10 is one embodiment of a build platform of an AM system having a plurality of parts and a witness coupon manufactured as a batch by the AM system.

With further reference to FIG. 10, it may be appreciated that one or more parts 212a, 212b may be produced during the AM process performed by the AM system 200. In this regard, the parts 212a and 212b may be produced substantially concurrently with the witness coupon 214 such that the witness coupon 214 shares one or more material properties with the parts 212a and 212b. Accordingly, as will become apparent in the discussion below, the witness coupon 214 may be tested to provide one or more properties which are shared by the parts 212a and 212b that have been manufactured concurrently with the witness coupon 214. As such, in the context in which a plurality of parts 212a, 212b are manufactured concurrently with the witness coupon 214, the derived properties may be applicable to all such parts 212a, 212b corresponding to the witness coupon 214. That is, the parts 212a, 212b may comprise a batch of parts and the batch of parts may be evaluated in regard to one or more properties derived from the single witness coupon 214 corresponding to the batch.

As described above, the use of AM techniques to produce a part 212 may result in uncertain, inconsistent, and/or unpredictable material properties related to the part 212. For instance, in contrast to traditional manufacturing techniques in which a part may be generated using traditional manufacturing including forging, milling, stamping, casting, or other traditional techniques, the material properties for a part 212 manufactured by way of an AM technique may be dependent upon variables in the AM process including the raw material used (e.g., the metal powder employed), the AM technique employed, characteristics of the AM tool, or other process variables. As such, unlike traditional manufacturing techniques in which material properties may be well established and easily retrieved (e.g., from property tables, raw material data sheets, and the like), materials used to manufacture parts 212 using AM techniques may be more variable. In turn, evaluation of such parts 212 may also be more difficult.

Accordingly, the present disclosure includes approaches that leverage the use of a witness coupon 214 to inform the evaluation of a concurrently manufactured part 212. As will be described in greater detail below, the testing of the witness coupon 214 may be used in a number of regards in relation to the evaluation of the part 212. Generally, the approaches described herein utilize nondestructive testing approaches that may include resonance inspection of a part to be evaluated. Accordingly, a frequency response of a part may be compared to a resonance standard as described above. However, in the context of the approaches described herein, the resonance standard may be at least in part based on an evaluation of the witness coupon 214. For instance, the resonance standard may be generated based on a result of a test of the witness coupon 214 or an existing resonance standard may be modified based on the result of a test of the witness coupon 214.

Figure 11:
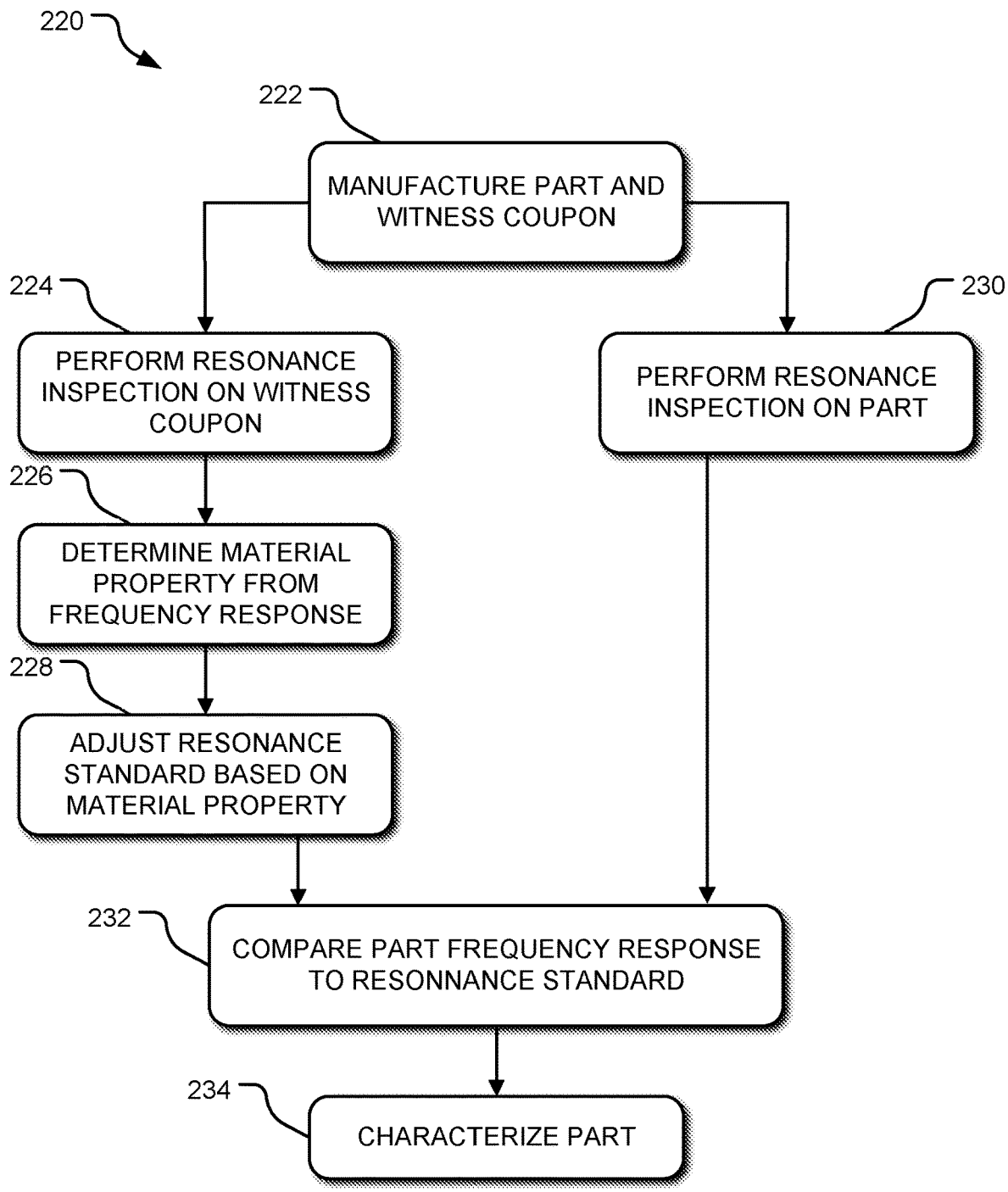
FIG. 11 is one embodiment of a method for evaluation of part using a resonance standard that is at least in part based on a test of a witness coupon corresponding to the part.

With further reference to FIG. 11, a method 220 is depicted as a flowchart. The method 220 may be used for evaluation of a part that is manufactured concurrently with a witness coupon. In this regard, the method 220 may include manufacturing 222 a part to be tested and a witness coupon. As described above, the part and witness coupon may be concurrently manufactured by an AM process or technique. Accordingly, it may be that the part and witness coupon have identical or nearly identical material properties by virtue of the fact the part and witness coupon are manufactured at the same time from the same raw materials using the same tooling or equipment.

The method 220 may also include performing a resonance test 224 of the witness coupon. In turn, the method 220 may include determining 226 a property of the witness coupon based on the testing 224 performed on the witness coupon. As may be appreciated, the frequency response of the witness coupon may provide information regarding the material properties of the witness coupon. Examples of such material properties may include, but are not limited to, mechanical properties of the witness coupon including the modulus of elasticity (Young's modulus), the shear modulus, Poisson's ratio, hardness, tensile strength, shear strength, or other appropriate material property.

While the method 220 is shown as performing 224 a resonance inspection of the witness coupon, it may be appreciated that other testing may be performed to derive the property from the witness coupon. Such testing may include destructive testing of the witness coupon (e.g., tensile tests or the like). Moreover, while the witness coupon is described above as a structure having a relatively simple geometry, it may be appreciated that the witness coupon may comprise a second part in a batch of parts. That is, with returned reference to FIG. 10, a first part 212a may comprise a witness coupon for a second part 212b. In this example, the first part 212a may be tested to determine the property on which the resonance standard is to be based. This may include destructive testing of the first part 212a, such that the first part 212a may be sacrificed to derive the property for testing of the second part 212b.

The method 220 may also include adjusting 228 a resonance standard based on the property (e.g., material property) that is determined 226 as a result of performing 224 the resonance inspection of the part. As will be described in greater detail below, the manner in which a resonance standard is initially generated and/or modified may vary in different contexts. However, for purposes of description of the method 220, it may be that the resonance standard to which a part is to be judged may be at least in part based on the material property of a witness coupon that may be determined by resonance inspection of the witness coupon.

The method 220 may also include performing 230 a resonance inspection the part made concurrently with the witness coupon. The performing 230 of the resonance inspection on the part may result in a frequency response as described above. In turn, the method 220 may include comparing 232 the frequency response of the part to the resonance standard 232 that is adjusted 228 based on the material property of the witness coupon. Furthermore, the method 220 may include characterizing 234 the part based on the comparing 232.

Further still, the method 220 may be used in relation to validation of a part as it relates to use as a replacement part. That is, in the context of a replacement part, a relatively small number of parts may be produced as compared to an originally manufactured part. However, the replacement parts may advantageously be validated to provide some indication that the replacement part performs in a manner consistent with an original part. As such, the above-noted method 220 for testing a part may be used to validate parts in this context. Specifically, the material property determined 226 from the witness coupon may be evaluated against criteria related to the performance of a part which is to be replaced. In other words, the part that is manufactured may be tested to determine whether material properties of the part conform to a replacement part standard in addition to the resonance inspection to determine if any defects exist in the part. In this regard, the approach to part evaluation illustrated in the method 220 may be used for validation of parts relative to existing or previously manufactured parts.

As described above, a resonance standard for a part to be tested may be derived or generated in a number of various approaches. As briefly described above, a resonance standard used in a resonance inspection of a part may be derived based on the testing of a population of parts and/or based on model derived approaches. Embodiments are provided below related to both approaches.

Figure 12:
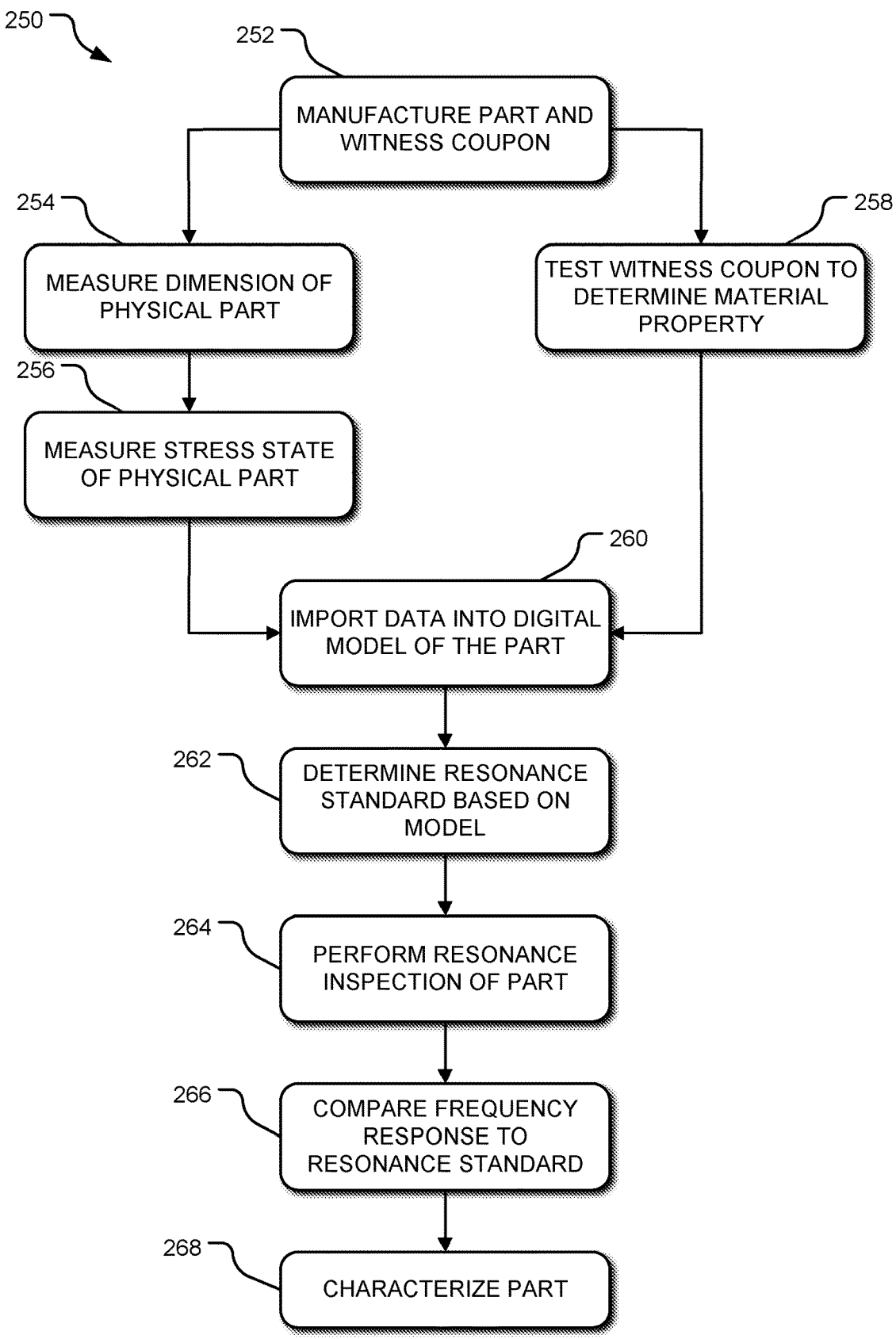
FIG. 12 is one embodiment of a method for evaluation of part using a resonance standard that is at least in part based on a test of a witness coupon corresponding to the part, where the resonance standard is generated based on an analysis of a digital model of the part.

Specifically, FIG. 12 illustrates a method 250 related to the evaluation of a part using a model to derive a resonance standard for the part to be tested. The method 250 may include manufacturing 252 a part to a nominal specification and a witness coupon. As described above, prior to manufacturing 252 the part and witness coupon, the part may be designed or modeled using a CAD program executing on a computing device as described above. Such a program may allow for input of nominal dimensions and part configurations to be defined such that the model of the part comprises a nominal part specification. The designing of the part may occur prior to the manufacture of a part. The part may be manufactured 252 to the nominal specification defined by the model. As may be appreciated, this may include processes used to transform information comprising the model into instructions for control of a manufacturing system (e.g., an AM system) for manufacture 252 of the part.

In turn, the method 250 may include a number of steps performed relative to the part and/or witness coupon to provide inputs to the model for use in generating a resonance standard. For instance, the part may be measured 254 to determine one or more actual part dimensions. As may be appreciated, the actual part dimensions may vary slightly to the nominal part specification due to manufacturing tolerances and the like. The measuring 254 may include any means for accurately determining the actual dimension of the part. This may include physical measurement by a user (e.g., using a caliper or the like), use of a coordinate measuring machine, three-dimensional scanning, or other techniques. For instance, the measuring 254 may include employing a structured light three-dimensional scanner. Such a structured light three-dimensional scanner may use blue light scanning and/or white light scanning for accurately determining one or more actual dimensions of the part.

Additionally or alternatively, the method 250 may include measuring 256 a stress state. The stress state may be measured by any appropriate means. One example may include the use of x-ray diffraction to provide stress state information regarding the part.

Further still, information regarding a property of the part may be derived by testing of the witness coupon. In this regard, the method 250 may include testing 258 (e.g., performing a resonance inspection) of the witness coupon to determine a property of the witness coupon. Alternative testing may include, for example, tensile testing. In any regard, the property of the witness coupon that is determined from the testing 258 may include a material property shared by the part that is concurrently manufactured with the witness coupon. Such material properties may include, but are not limited to, yield strength, ultimate tensile strength, Young's modulus (modulus of elasticity), and Poisson's ratio.

In turn, the method 250 may also include importing 260 data into the model. The data that is imported 260 into the model may at least include a material property determined from testing 258 of the witness coupon. Furthermore, the actual dimension of the part and/or stress state information for the part may be imported as well. As can be appreciated, by including additional data into the model (e.g., including a measured material property, actual part dimensions, and/or part stress state information), the model may more accurately reflect the behavior of the part that has been manufactured 252.

In turn, the method 250 may include performing an analysis of the model based on the data derived from testing 258 the witness coupon and/or from the actual measurements 254 and/or 256 performed on the part. As may be appreciated, a modal analysis may be performed on the model part. Such modal analysis may be performed using a finite element analysis of the part to predict or model an anticipated frequency response of the modeled part. In this regard, the modal analysis, and thus resulting anticipated frequency response, may be at least in part based on a material property of the part. For instance, a part comprising a polymer may have a different anticipated frequency response than that the same part comprising a metal may have. In turn, the modal analysis may be used to determine 262 a resonance standard, which may be based on an anticipated frequency response based on the modal analysis.

The method 250 may also include performing 264 a resonance inspection of the part to provide a frequency response of the part. The frequency response may be compared 266 to the resonance standard that is based on the results of the modal finite element analysis performed on the model having data resulting from the measurement of the part and/or testing of the witness coupon. Accordingly, the method may include characterizing 268 the part into at least one of a good/acceptable or bad/unacceptable category.

Figure 13:
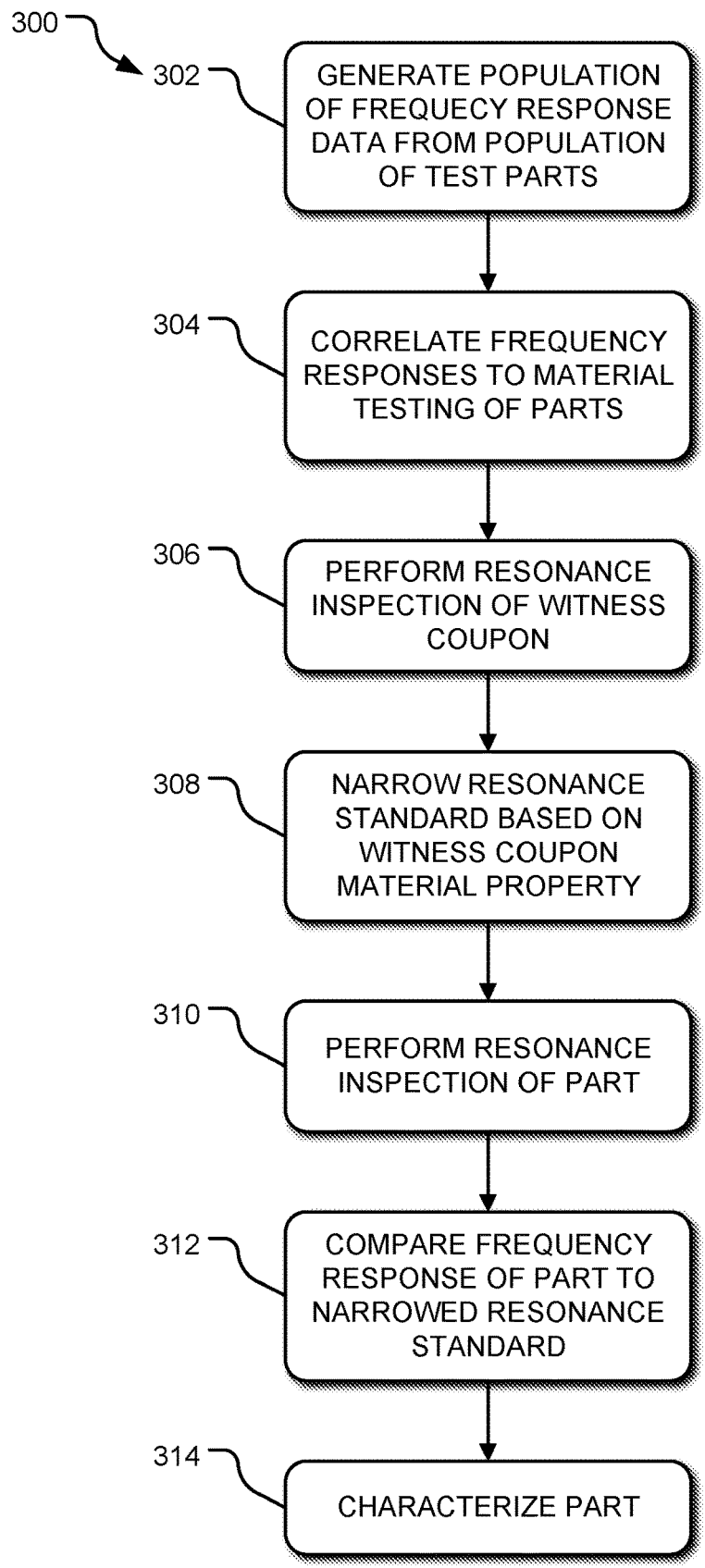
FIG. 13 is one embodiment of a method for evaluation of part using a resonance standard that is at least in part based on a test of a witness coupon corresponding to the part, where the resonance standard is generated based on frequency response data from a population of parts.

In addition, a resonance standard for use in a resonance inspection may be derived based on an analysis of the frequency response of a population of parts. Turning to FIG. 13, a method 300 is depicted corresponding to such an approach. The method 300 may include generating 302 a population of frequency responses corresponding to a population of parts that have undergone resonance inspection to obtain the frequency responses. In addition, the population of parts may be otherwise tested (e.g., including potentially destructive testing) to determine whether the parts are good or bad. In turn, the generated 302 population of frequency response data may include data representative of good and/or bad parts.

Figure 14:
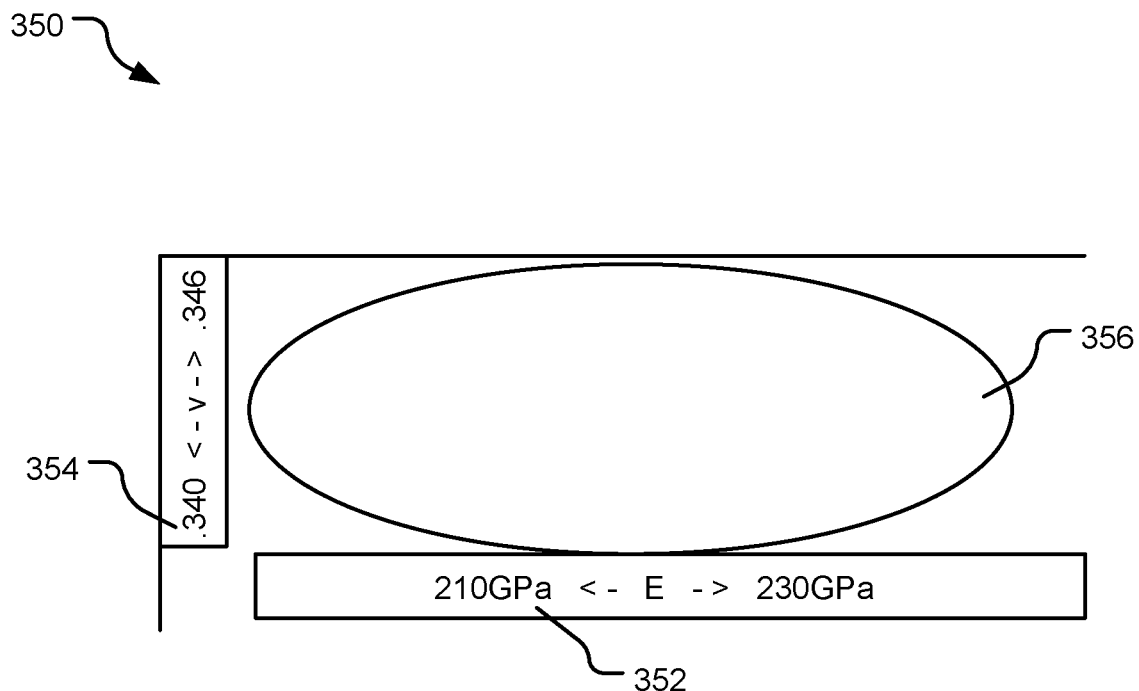
FIGS. 14 and 15 present plots depicting frequency response data for a population of parts plotted relative to material properties to allow for narrowing of the population of parts used to generate a resonance standard based on a property determined by the evaluation of a witness coupon.

In addition, the method 304 may include correlating the frequency responses from the population of parts to the material properties for corresponding ones of the parts. As may be appreciated, the material properties of a part may factor into the anticipated frequency response of a part. Variance in a material property over the population of parts may result in a relatively large spread in expected frequency responses based on different material properties of the parts of the population of parts. For instance, with further reference to FIG. 14, a plot 350 is provided that illustrates a field 356 of resonance metric variation that correlates to different materials properties. Specifically, the horizontal axis 352 is representative of the modulus of elasticity (Young's modulus), and the vertical axis 354 represents Poisson's ratio. In turn, the field 356 shown in relation to the horizontal axis 352 and vertical axis 354 may represent frequency response data plotted relative to the material properties represented on the respective axes. As such, the field 356 may be representative of frequency response data on which a resonance standard is based.

Figure 15:
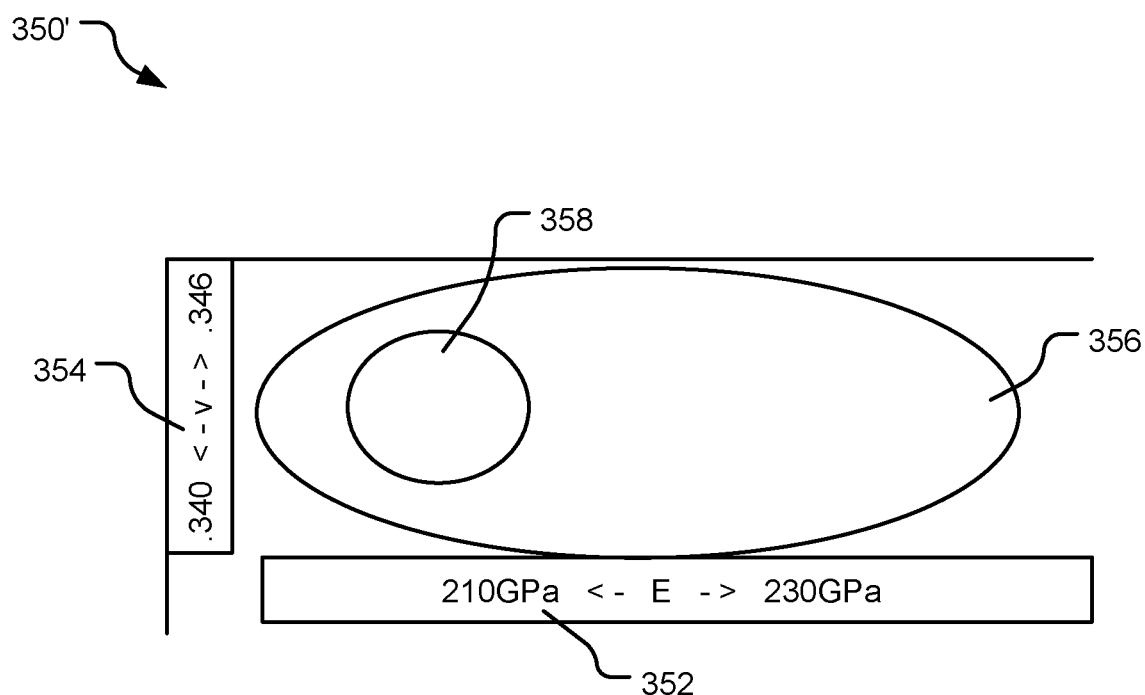
Figure 16:
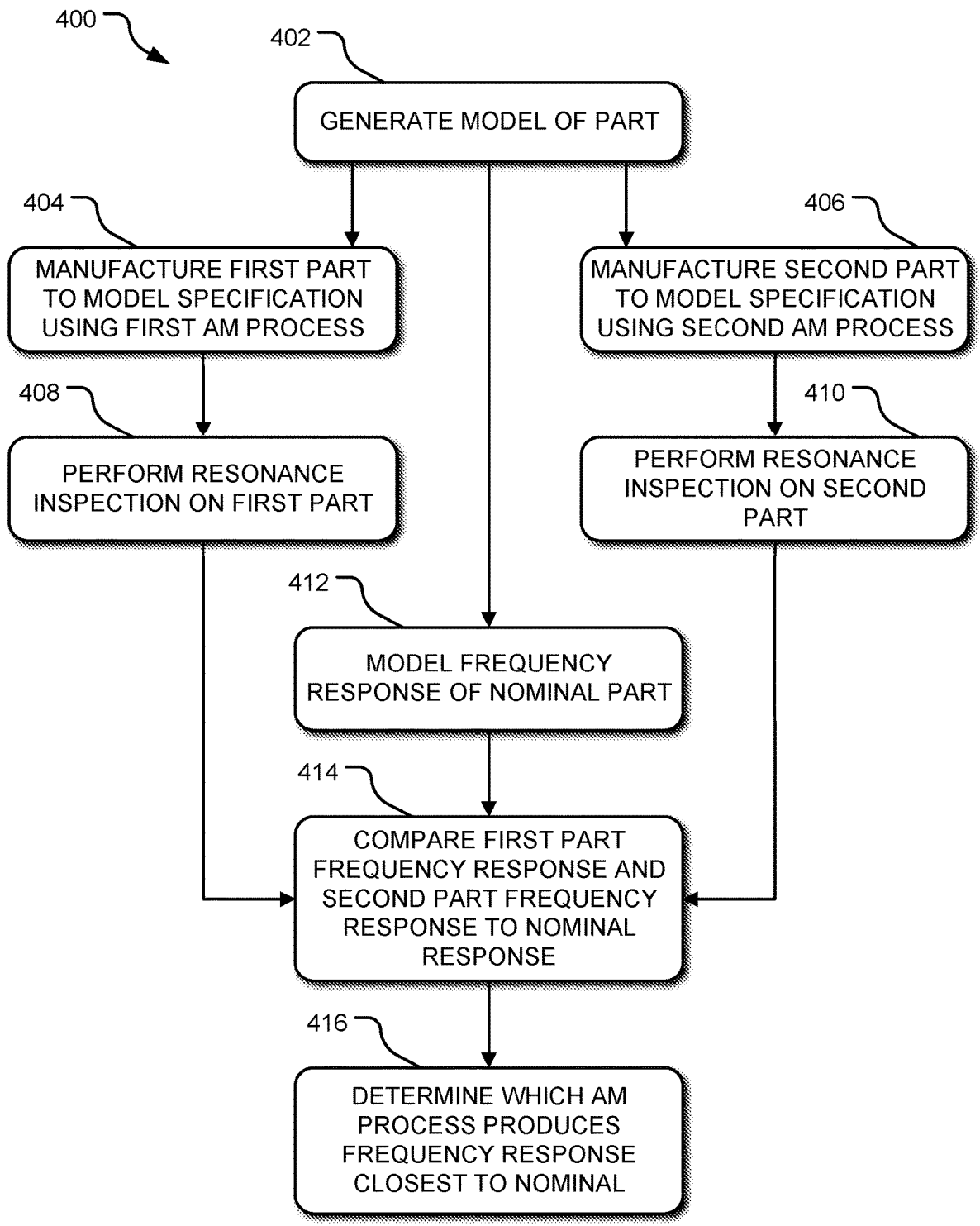
FIG. 16 is one embodiment of a method for evaluation of different AM processes used to manufacture parts to a nominal specification.

Returning to FIG. 13, the method 300 may also include performing 306 a resonance inspection of a witness coupon that is concurrently manufactured with a part to be tested. The method 300 may include narrowing 308 the resonance standard based on the material property derived from performing 306 the resonance inspection of the witness coupon. Such a narrowing 308 is illustrated in FIG. 15 that depicts a modified plot 350'. The modified plot 350' includes a narrowed field 358 that represents frequency response data from the population of parts centered about the material properties derived from performing 306 the resonance inspection of the witness coupon. In turn, the frequency response data from the narrowed field 358 may be used in relation to a resonance standard.

As such, the method 300 may further include performing 310 a resonance inspection of the part to be tested. The method 300 may also include comparing the frequency response of the part to be tested to the narrowed resonance standard based on the narrowed field 358. The part may then be characterized 314 in response to the comparing 312 using the narrowed resonance standard.

In another embodiment, a method 400 for evaluation of various AM processes may be conducted in relation to a model-based evaluation. Specifically, the method 400 may include generating a model (e.g., a three-dimensional digital model) of a part to be manufactured. The model may define a nominal specification desired for the part. In turn, the method 400 may include manufacturing 404 a first part using a first AM process and manufacturing 406 a second part using a second AM process. The first AM process and second AM process may differ in any respect including the fundamental approach used in the AM process, differing materials, differing tooling, and/or differing approaches to the generation of instructions for manufacturing the part.

In any regard, the method 400 may include performing 408 a resonance inspection on the first part to generate a first frequency response and performing 410 a resonance inspection on the second part to generate a second frequency response. Additionally, the method 400 may include modeling a nominal frequency response. In one example, the nominal frequency response may be generated by performing modal analysis of the nominal specification corresponding to the modeled part using a finite element analysis. In turn, the method 400 may include comparing 414 the first and second frequency responses to the nominal frequency response and determining 416 which of the two AM processes results in a part with a frequency response most like the nominal response. This may inform which of the AM processes is most desirable for use in producing the part to the nominal specification defined in the model.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for performing a resonance inspection of a part, comprising:
   obtaining a witness coupon that is manufactured concurrently with a part to be tested, wherein the witness coupon and the part comprises a material from which the witness coupon and the part are both manufactured;
   testing the witness coupon to determine a property of the material;
   performing a resonance inspection of the part, the resonance inspection comprising exciting the part at a plurality of input frequencies and obtaining a frequency response of the part at each of the plurality of input frequencies;
   comparing the frequency response of the part to a resonance standard, wherein the resonance standard is at least in part based on the property of the material as determined by the testing of the witness coupon; and
   characterizing the part as acceptable or unacceptable based on the comparing.

2. The method of claim 1, wherein the part and the witness coupon are concurrently manufactured using an additive manufacturing process.

3. The method of claim 2, wherein the witness coupon comprises another part manufactured concurrently with the part.

4. The method of claim 3, wherein the another part is manufactured based on a nominal specification shared with the part.

5. The method of claim 1, wherein the witness coupon comprises a shape different than the part.

6. The method of claim 5, wherein the witness coupon comprises a simple right cylinder.

7. The method of claim 1, further comprising:
   measuring at least one dimension of the part;
   wherein the resonance standard is at least in part based on the at least one dimension.

8. The method of claim 7, wherein the measuring comprises scanning the part using a three-dimensional scanner.

9. The method of claim 8, wherein the measuring comprises scanning the part using a structured light three-dimensional scanner.

10. The method of claim 9, wherein the structured light three-dimensional scanner comprises at least one of white light scanning and blue light scanning.

11. The method of claim 1, further comprising:
    measuring a stress state of the part;
    wherein the resonance standard is at least in part based on the stress state.

12. The method of claim 11, wherein the measuring the stress state comprises an x-ray diffraction inspection of the part.

13. The method of claim 1, wherein the performing, comparing, and characterizing steps are repeated for a plurality of parts that are all concurrently manufactured from the material.

14. The method of claim 1, wherein the method is performed on a plurality of parts each manufactured in a common batch as the part and the witness coupon.

15. The method of claim 14, wherein the plurality of parts comprises all parts manufactured in the common batch.

16. The method of claim 1, wherein the resonance standard is generated at least in part based on a computer-generated three-dimensional digital model of the part having the property of the material as determined by the testing.

17. The method of claim 16, wherein a finite element analysis comprising a modal analysis is performed on the digital model to generate a model resonance response of the part, and wherein the resonance standard is at least in part based on the model resonance response of the part.

18. The method of claim 17, wherein the resonance standard comprises a window of acceptable resonance responses defined relative to the model response provided by the finite element analysis of the digital model.

19. The method of claim 18, wherein the window of acceptable resonance responses is generated based on model responses of a plurality of variations of at least one of the property of the material or the at least one dimension within a predetermined range relative to the digital model.

20. The method of claim 16, wherein the resonance standard is based on a model response of the digital model having at least one defect.

21. The method of claim 20, wherein the part is characterized as unacceptable based on a correspondence between the frequency response of the part and the model response of the digital model having the at least one defect.

22. The method of claim 1, wherein the resonance standard is generated at least in part based on resonance inspection results for a plurality of tested parts other than the part.

23. The method of claim 22, wherein the at least one material property reduces the plurality of tested parts to a subset of tested parts with corresponding material properties to the at least one material property, and wherein the resonance standard is based on the resonance inspection results for the subset of tested parts.

24. The method of claim 1, wherein the resonance inspection of the part occurs prior to completion of the manufacturing of the part.

25. The method of claim 1, wherein the test comprises a resonance inspection of the witness coupon.

26. The method of claim 25, wherein the method comprises:
performing the resonance inspection of the witness coupon to measure the property of the material.

27. A method for generating a resonance standard for evaluation of at least one part using a resonance inspection of the at least one part, comprising:
modeling a part to be tested using a nominal specification for the part, wherein the modeling generates a computer-generated three-dimensional digital model of the part based on the nominal specification;
receiving at least one property of a material from which the part is manufactured, wherein the property of the material is input to the digital model, and wherein the property of the material is determined from testing a witness coupon manufactured concurrently with the part;
performing a finite element analysis on the digital model based on the property to generate a model resonance response of the part as manufactured from the digital model; and
generating a resonance standard for the part based on the finite element analysis of the digital model.

28. The method of claim 27, wherein the resonance standard comprises a window of acceptable resonance responses defined relative to the model response provided by the finite element analysis of the digital model.

29. The method of claim 28, wherein the witness coupon comprises the material from which the part is manufactured.

30. The method of claim 29, wherein the test comprises a resonance inspection of the witness coupon.

31. The method of claim 30, wherein the method comprises:
performing the resonance inspection of the witness coupon to measure the property of the material.

32. The method of claim 27, further comprising:
receiving at least one dimension of the part as manufactured, wherein the dimension is used to refine a corresponding nominal dimension of the nominal specification for the part.

33. The method of claim 32, wherein the dimension of the part is determined using a three-dimensional scanner to measure the dimension from the part.

34. The method of claim 33, wherein the three-dimensional scanner comprises a structured-light three-dimensional scanner that employs at least one of white light scanning and blue light scanning.

35. The method of claim 34, further comprising:
measuring the dimension of the part using the structured-light three-dimensional scanner.

36. The method of claim 32, further comprising:
receiving stress state information regarding the part as manufactured, wherein the stress state information is input to the digital model.

37. The method of claim 36, wherein the stress state information is measured from the part using an x-ray diffraction inspection of the part.

38. The method of claim 37, further comprising:
measuring the stress state information of the part.

39. The method of claim 27, further comprising:
performing a resonance inspection of the part, wherein the resonance inspection comprises exciting the part at a plurality of input frequencies and obtaining a frequency response of the part at each of the plurality of input frequencies; and
comparing the frequency response of the part to the resonance standard; and
characterizing the part as acceptable or unacceptable based on the comparing.

40. The method of claim 39, wherein the part is manufactured using an additive manufacturing technique, and wherein the nominal specification corresponds to another part manufactured using a manufacturing technique other than additive manufacturing, and wherein the characterizing comprises determining whether the part conforms to a performance of the another part.

41. The method of claim 40, wherein the part comprises a replacement part for the another part.

42. The method of claim 27, further comprising:
obtaining a first part and a second part each manufactured to the nominal specification corresponding to the digital model, wherein the first part is manufactured by a first manufacturing process and the second part manufactured by a second manufacturing process;
performing a resonance inspection of the first part, wherein the resonance inspection comprises exciting the first part at a plurality of input frequencies and obtaining a first frequency response of the first part at each of the plurality of input frequencies;

performing the resonance inspection of the second part, wherein the resonance inspection comprises exciting the second part at the plurality of input frequencies and obtaining a second frequency response of the first part at each of the plurality of input frequencies; and comparing the first frequency response and the second frequency response to the resonance standard to determine which of the first part or the second part comprises a frequency response that is most similar to the model resonance response; and identifying one of the first manufacturing process or the second manufacturing process for manufacture of additional parts based on which corresponding one of the first frequency response or the second frequency response is most similar to the model resonance response.

\* \* \* \* \*